(12) United States Patent
Lunn et al.

(10) Patent No.: US 10,676,374 B1
(45) Date of Patent: Jun. 9, 2020

(54) AMMONIA CAPTURE AND RECOVERY SYSTEM AND METHOD FOR REMOVING AMMONIA FROM A WASTEWATER STREAM

(71) Applicant: United States of America as Represented by the Administrator of the National Aeronautics and Space Administration, Washington, DC (US)

(72) Inventors: Griffin M. Lunn, Cocoa Beach, FL (US); Andrew F. Gleich, Jacksonville, FL (US); Oscar A. Monje, Merritt Island, FL (US); Julia M. Worrell, New Franklin, OH (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 295 days.

(21) Appl. No.: 15/635,011

(22) Filed: Jun. 27, 2017

Related U.S. Application Data

(63) Continuation-in-part of application No. 13/940,342, filed on Jul. 12, 2013, now abandoned.
(Continued)

(51) Int. Cl.
*C02F 1/28* (2006.01)
*C02F 101/16* (2006.01)

(52) U.S. Cl.
CPC ......... *C02F 1/281* (2013.01); *C02F 2101/16* (2013.01); *C02F 2209/03* (2013.01);
(Continued)

(58) Field of Classification Search
CPC .............. C02F 2303/16; C02F 2101/16; C02F 2209/03; C02F 2209/06; C02F 2209/40; C02F 2209/44
See application file for complete search history.

(56) References Cited

U.S. PATENT DOCUMENTS 6,884,355 B2   4/2005   Kamiya et al.
2005/0258102 A1  11/2005  Litz
(Continued)

OTHER PUBLICATIONS

Lunn, Strategies for stabilizing nitrogenous compounds in ECLSS wastewater: Top-down system design and unit operation selection with focus on bio-regenerative processes for short and long term scenarios., Jan. 1, 2011, All pages (Year: 2011).*
(Continued)

*Primary Examiner* — Bobby Ramdhanie
*Assistant Examiner* — Donovan Bui-Huynh
(74) *Attorney, Agent, or Firm* — Jonathan J. Leahy; Mark W. Homer

(57) ABSTRACT

A wastewater stream including ammonia and water is fed to at least one packed column including packing material having a surface of solid magnesium phosphate or solid magnesium ammonium phosphate or both. Each of the packed columns is capable of cycling between an ammonia absorption operation and an ammonia regeneration operation. The magnesium phosphate compound reacts with the water and ammonia to form a magnesium ammonium phosphate compound. In one embodiment, this system provides for the regeneration of the magnesium ammonium phosphate compound for further use as an ammonia sorber. In another embodiment, the magnesium ammonium phosphate compound is used as fertilizer. Additionally, the ammonia capture and recovery system may be used in conjunction with other unit operations in an overall wastewater treatment system.

5 Claims, 4 Drawing Sheets

Related U.S. Application Data

(60) Provisional application No. 61/671,306, filed on Jul. 13, 2012.

(52) U.S. Cl.
CPC ...... *C02F 2209/06* (2013.01); *C02F 2209/40* (2013.01); *C02F 2209/44* (2013.01); *C02F 2303/16* (2013.01)

(56) References Cited

U.S. PATENT DOCUMENTS

| | | |
|---|---|---|
| 2007/0039893 A1 | 2/2007 | Kemp |
| 2008/0053909 A1 | 3/2008 | Fassbender |
| 2009/0206028 A1 | 8/2009 | Jiang |
| 2012/0003135 A1 | 1/2012 | Vollendorf |
| 2013/0020259 A1 | 1/2013 | Wallace |
| 2014/0116939 A1 | 5/2014 | Chen |

OTHER PUBLICATIONS

Bhuiyan, Thermal decomposition of struvite and its phase transition, Nov. 19, 2007, All pages (Year: 2007).*

Li, Struvite Precipitation for Ammonia Nitrogen Removal in 7-Aminocephalosporanic Acid Wastewater, Feb. 21, 2012., All pages (Year: 2012).*

M.I.H. Bhuiyan, et al, "Thermal decomposition of struvite and its phase transition," Chemosphere 70 (2008) 1347-1356.

V. Babic-Ivancic, et al., "Kinetics of struvite to newberyite transformation in the precipitation system $MgCl_2$-$NH_4H_2PO_4$-NaOH-$H_zO$," Water Research 40 (2006) 3447-3455.

M. Turker, et al., "Chemical equilibrium model of struvite precipitation from anaerobic digester effluents," Research Article, Turkish J. Eng. Env. Sol. 34 (2010), 39-48.

AceChemPack Tower Packing, "Column Packings," Feb. 1, 2002, 1-5.

G. Lunn, "Strategies for stabilizing nitrogenous compounds in ECLSS wastewater: Top-down system design and unit operation selection with focus on bio-regenerative processes for short and long term scenarios," 42nd International Conference on Environmental Systems, Jul. 15-19, 2012, San Diego California, 1-15.

Van Eekert, et al., "Explorative Research on Innovative Nitrogen Recovery," ISBN 978.90.5773.585.1, Jan. 2012, 1-66, Downloaded on Jun. 19, 2019 from https://www.researchgate.net/publication/283417450.

* cited by examiner

AMMONIA CAPTURE AND RECOVERY SYSTEM AND METHOD FOR REMOVING AMMONIA FROM A WASTEWATER STREAM

CROSS-REFERENCE TO RELATED APPLICATIONS

This application is a continuation-in-part of U.S. patent application Ser. No. 13/940,342 filed on Jul. 12, 2013, which claims the benefit of priority under 35 USC § 119(e) of U.S. Provisional Patent Application Ser. No. 61/671,306 filed on Jul. 13, 2012, the contents of which are incorporated herein by reference.

ORIGIN OF THE INVENTION

The invention described herein was made in the performance of work under NASA contracts and is subject to the provisions of Section 20135(b) of the National Aeronautics and Space Act, Public Law 111-314, § 3 (124 Stat. 3330, 51 U.S.C. Chapter 201 and 35 U.S.C. § 202), and may be manufactured and used by or for the Government for governmental purposes without the payment of any royalties thereon or therefore.

BACKGROUND OF THE INVENTION

1. Field of the Invention

The present invention generally relates to an ammonia capture and recovery system that includes at least one packed column including packing material having a surface of solid magnesium phosphate or solid magnesium ammonium phosphate or both. The present invention is also directed to a method of removing ammonia from a wastewater stream using said ammonia capture and recovery system. In one embodiment, the ammonia capture and recovery system may be used in an overall wastewater treatment system.

2. Description of Related Art

Water consists of the majority of the daily mass requirements for crewed space missions. Used for drinking, food prep, or hygiene; water is one of the most critical life support elements. Reliable water recovery is paramount for long-term space exploration either on the International Space Station (ISS) or beyond our gravity well. Advances in water recovery have allowed longer mission durations and decreased launch costs. In order to visit or even inhabit extraterrestrial bodies (e.g., Mars, Europa, etc.), further advances in water recovery are needed.

Wastewater in a spacecraft is made up of multiple fractions. Humidity condensate is produced from scrubbers that remove excess humidity from the cabin and reclaim water contaminated with volatile organic compounds (VOCs). Hygiene water stems from hand washing, food waste, and other personal care like shaving or brushing teeth. Urine waste is made up of urine and its corresponding flush water used in spacecraft toilet systems. Future wastewater streams include laundry which has been considered for the ISS. These water streams contain high amounts of total dissolved solids (TDS), total organic carbon (TOC), total nitrogen (TN), and biological oxygen demand (BOD); which are much higher than terrestrial wastewater streams.

Early spacecraft water recovery systems focused on humidity condensate. On Salut-4 water recovery was first attempted on humidity condensate for use in food and drink preparation. This system was upgraded for MIR to handle humidity condensate and urine in separate systems. Humidity condensate was treated using absorption and catalytic oxidation while urine was simply distilled with effluents from both processes and sent to polishing unit operations.

In order for the ISS to maintain a crew of six, water recovery was needed. Current ISS architecture offers no nutrient recovery from wastewater treatment and reuse. Toxic brines are produced that have limited ability to be "mined" for nutrients to support plant-growth systems for a more "closed" life support system. In addition, urea storage and dewater is limited and water recovery is below 85%. Like previous Russian systems, humidity condensate and urine were recycled; however hygiene water was also processed. Urine waste collected from toilets was pretreated using oxone/sulfuric acid or chromic acid (depending on which side of the ISS) in order to reduce volatility of ammonia (low pH) and to prevent microbial growth (to prevent breakdown of urea into ammonia and carbon dioxide). This pretreated urine was stored in tanks for weeks to months at a time before a batch was distilled. Distillation occurred in the vapor compression distillation (VCD) unit where water and residual VOCs and trace ammonia were separated from the brine (i.e., urine, salts, hardness). Water recovery was dependent on a number of factors, with one of the main limitations being salting out of the brine and hardness fouling the unit. The treated urine along with hygiene water and humidity condensate were then passed through a series of air-liquid separators to remove entrained air, multifunction filters to remove suspended and dissolved solids, a catalytic oxidation reactor to remove small chain organic compounds, and ion exchange to remove the rest of the dissolved ions and add iodine to the now potable water. This system had many advantages. This architecture used proven unit operations and delivered high-quality water for potable use. This system handled hygiene water including toothpaste and various soaps unlike previous systems. Urine was purified using VCD which is highly energy efficient with low operating temperature (near body temperature) and recycled latent heat of vaporization (similar to a regenerative heat exchanger but with phase changes). However, this system has some limitations. Water recovery is poor due to the large amount of brine solids formed which inhibits further water recovery. The brine itself is highly toxic due to the pretreatment used (chromic acid) and prevents nutrient recovery activities from being performed. There have been times where the pretreatment failed and microbes were able to multiply and break down the urea to ammonia causing the batch to be lost with zero water recovery possible. Reliability has been a concern, especially with the vapor compression distillation unit and its long period of downtime. Consumable quality is low compared to other systems but still requires pretreatment chemicals, pH control, filtration beds, catalyst, and ion exchange beds, which are not regenerable in-situ and therefore need resupply. Implementing hydroponics or brine recovery systems would be impossible with this pretreatment regime, and this system would require heavy modification or a total redesign to accomplish this.

BRIEF SUMMARY OF THE INVENTION

The present invention is directed to an ammonia capture and recovery system that includes at least one packed column including packing material having a surface of solid magnesium phosphate (MP) or solid magnesium ammonium phosphate (MAP) or both. Each of the packed columns is capable of cycling between an ammonia absorption operation and an ammonia regeneration operation. The ammonia absorption operation includes subjecting at least one of the packed columns to a wastewater influent stream including ammonia and water to convert at least some of the solid magnesium phosphate on the surface of the packing material to solid magnesium ammonium phosphate on the surface of the packing material resulting in a packed column absorber effluent stream having a reduced amount of ammonia compared to the wastewater influent stream. The ammonia regeneration operation includes subjecting at least one packed column to a regeneration temperature above 50° C. or a regeneration pressure below 1 atmosphere (ATM) or both to convert at least some of the solid magnesium ammonium phosphate on the surface of the packing material to solid magnesium phosphate on the surface of the packing material and regenerated vapor-phase ammonia and water. The regenerated vapor-phase ammonia and water is purged from the packed column. In one embodiment, the magnesium ammonium phosphate material is used as fertilizer. Additionally, the ammonia capture and recovery system may be used in conjunction with other unit operations in an overall wastewater treatment system.

This ammonia capture and recovery system is optimized to remove ammonia at various concentrations from various wastewater sources with low contact time (i.e., residence time) and without adding any further substantial amounts of chemicals and/or microbes to the effluent (other than a basic solution to maintain the pH). This ammonia capture and recovery system uses a solid magnesium phosphate compound instead of multiple liquid influents, such as magnesium chloride, ammonia, and/or phosphoric acid, which simplifies control and reduces the complexity of the system. The solid magnesium phosphate compound allows plug-flow configurations to be used when effluent ammonia concentration is a priority over magnesium ammonium phosphate compound production. Using a solid magnesium phosphate compound also allows regeneration, and repeating the cycle does not require extra equipment.

Advantages compared to biological systems mainly deal with complexity. The magnesium phosphate compound sorption requires orders of magnitude less contact time (hours compared to days) and has zero start-up time. Performance is instantaneous and spare columns can be used while desorption occurs in a carousel fashion. Complexity is low since this is simply a packed column of material compared to a bioreactor. However, the struvite absorption system includes energy and vacuum requirements for regeneration which are higher than comparable bioreactors. Absorption capacity is limited (e.g., 70 mg $NH_3$/g MP solid) so regeneration is a common occurrence.

In order to handle short-term and long-term missions with or without hydroponic systems or brine recovery, an overall wastewater treatment system was devised including modular architecture to handle these requirements. Instead of stabilizing the urea, it made better sense to optimize and regulate its breakdown to ammonia which can then be selectively removed from the wastewater using the above-mentioned ammonia capture and recovery system. This allows the ammonia to be used for other purposes (e.g., nutrients, refrigeration, pressurizing gas as nitrogen, etc.) while simultaneously reducing the dissolved solids in the brine and allowing higher theoretical water recovery before salting out. Combining the wastewater streams allows efficient TOC and TN removal in all the streams and reduces the pressure on the water polisher section. Removing the ammonia (and urea) before water recovery prevents ammonia from reaching the polishing section and reducing the consumable demand. Without urea in the brine, brine recovery unit operations become more feasible and the de-brined brine can be recycled back to water recovery. This basic scheme is not confined to any specific unit operations, but allows various unit operations to be auditioned and rotated out to optimize the process. As long as the reaction goes to completion or near completion the wastewater treatment system functions as expected. Individual unit operations can be tried for each section and compared to each other to increase conversion, reduce size, lower consumable demand, or increase reliability. To fit with the modularity of the wastewater treatment system, the system goals and requirements can change and, with unit operations, changes can meet those requirements without scrapping the whole wastewater treatment system. Some of these changes can be as simple as running a different chemical reaction in a vessel or as complex as adding a plant growth system to augment food supplies. With this flexibility, this wastewater treatment system will not be immediately obsolete with ever changing mission requirements. By utilizing biological treatment systems that can perform different reactions in the same reactor the "agility" of the system can be increased.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE INVENTION

Figure 1:
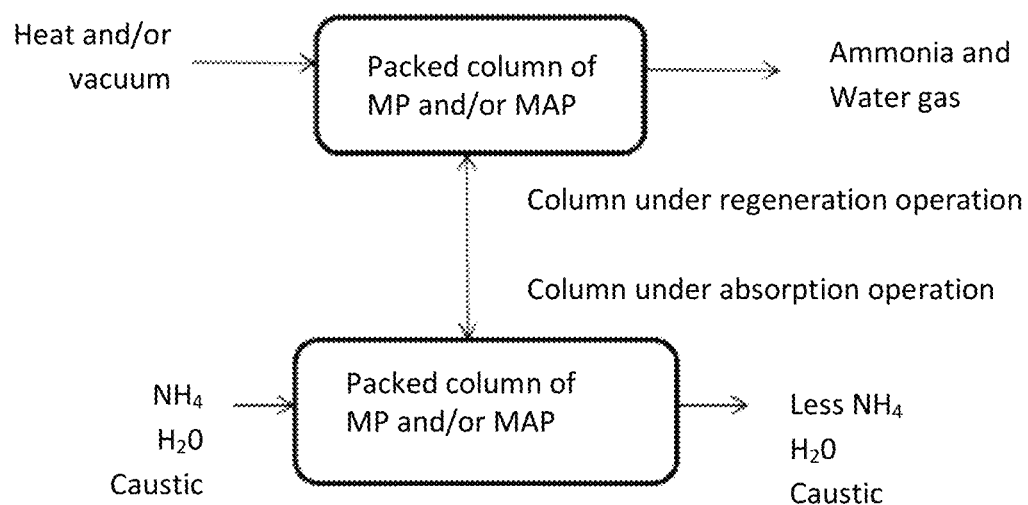
FIG. 1 illustrates the ammonia capture and recovery system in accordance with one embodiment of the present invention.

The present invention is directed to an ammonia capture and recovery system that includes at least one packed column including packing material having a surface of solid magnesium phosphate (MP) or solid magnesium ammonium phosphate (MAP) or both. Each of the packed columns is capable of cycling between an ammonia absorption operation and an ammonia regeneration operation. The ammonia absorption operation includes subjecting at least one of the packed columns to a wastewater influent stream including ammonia and water to convert at least some of the solid magnesium phosphate on the surface of the packing material to solid magnesium ammonium phosphate on the surface of the packing material resulting in a packed column absorber effluent stream having a reduced amount of ammonia compared to the wastewater influent stream. Typical wastewater streams also contain minerals such as sodium and potassium. The ammonia regeneration operation includes subjecting at least one packed column to a regeneration temperature above 50° C. or a regeneration pressure below 1 ATM or both to convert at least some of the solid magnesium ammonium phosphate on the surface of the packing material to solid magnesium phosphate on the surface of the packing material and regenerated vapor-phase ammonia and water. The regenerated vapor-phase ammonia and water is purged from the packed column. FIG. 1 illustrates the ammonia capture and recovery system in accordance with a preferred embodiment of the present invention. As provided in FIG. 1, the "less $NH_4$" is about 50 ppm less ammonia during a recirculation operation and <10 ppm total ammonia during a breakthrough operation. The schematic in FIG. 1 shows an operation wherein one packed column is switching streams.

Figure 2:
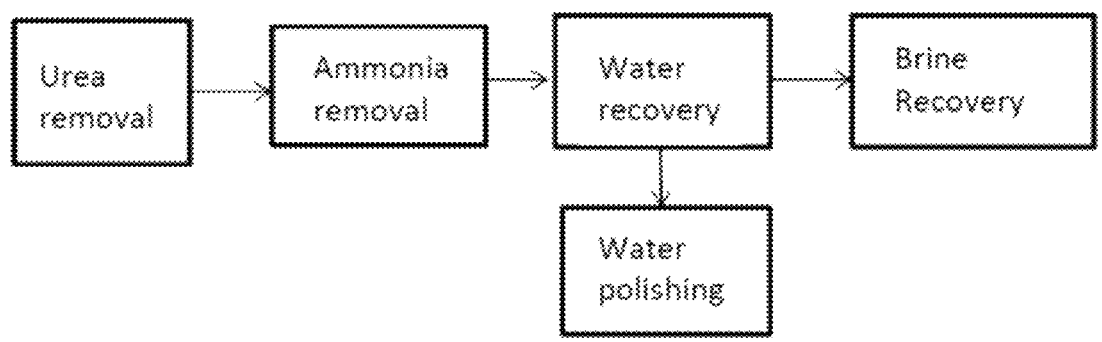
FIG. 2 illustrates the basic process flow diagram of a wastewater treatment system in accordance with one embodiment of the present invention.

Additionally, the ammonia capture and recovery system may be used in conjunction with other unit operations in an overall wastewater treatment system as shown in FIG. 2. The operations of this overall wastewater treatment system is discussed in further details below.

Figure 3:
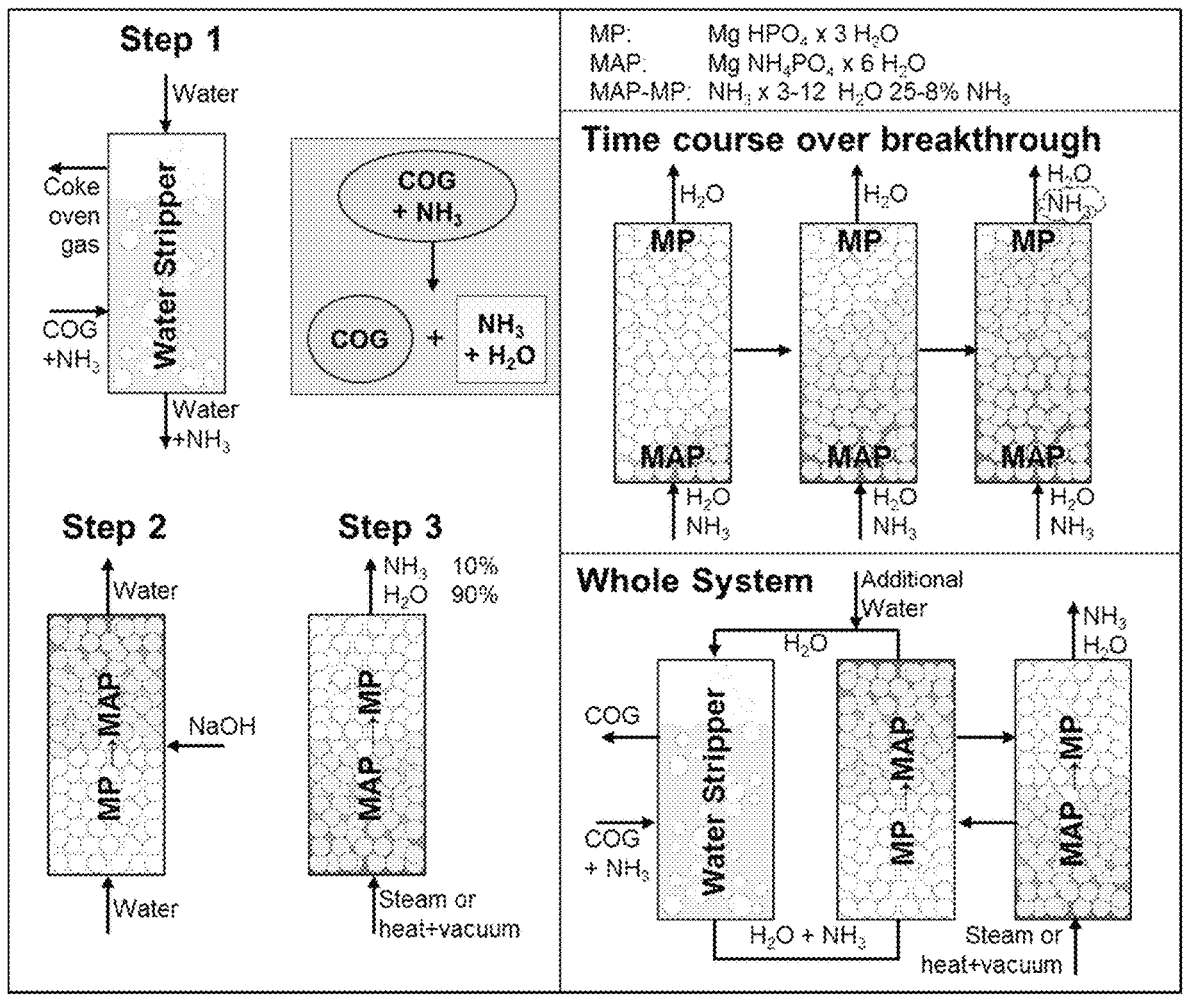
FIG. 3 illustrates the process conditions in the ammonia capture and recovery system in accordance with one embodiment of the present invention.

In one embodiment, the magnesium phosphate is magnesium phosphate dibasic trihydrate (also referred to herein as "MP") and the magnesium ammonium phosphate is magnesium ammonium phosphate hexahydrate (also referred to herein as "struvite" or "MAP"). As seen in FIG. 3, when MP is exposed to ammonia at elevated pH in an aqueous solution at standard temperature and pressure (STP) (i.e., 25° C. and 1 ATM) it spontaneously reacts to form magnesium ammonium phosphate hexahydrate (i.e., struvite):

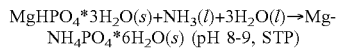
$MgHPO_4 \cdot 3H_2O(s) + NH_3(l) + 3H_2O(l) \rightarrow Mg\text{-}NH_4PO_4 \cdot 6H_2O(s)$ (pH 8-9, STP)

This reaction can be reversed to yield ammonia and water vapor and regenerate the MP:

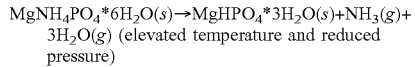
$MgNH_4PO_4 \cdot 6H_2O(s) \rightarrow MgHPO_4 \cdot 3H_2O(s) + NH_3(g) + 3H_2O(g)$ (elevated temperature and reduced pressure)

The effluent ammonia and water vapor can be used as fertilizer for plant hydroponic growth systems or even purified and injected into ammonia-based refrigeration systems commonly used in spacecraft. The resulting MP is then used to sorb more ammonia and can be regenerated repeatedly with minimal substrate loss. MP is extremely selective for ammonia and ignores most other chemical species in wastewater. The resulting MAP, along with MP, are sparingly soluble in water and do not increase effluent magnesium and phosphate levels and can, in fact, decrease them by precipitating more MP. The packed columns preferably house particles of the magnesium phosphate compound ranging from 50-500 microns, most preferably in the range of 100-200 micron range. In one embodiment, the stoichiometric amount of $Mg:PO_4:NH_3$ is minimal 1:1:1, and preferably about 1.5:1.5:1 for a fluidized bed and higher for a plug flow reactor. Influent aqueous ammonia is preferably supplied along with a basic solution (i.e., caustic) to maintain the influent stream at a pH of 8.7-9.2 and the effluent stream at a pH of 8.5-9.0. The basic chemical, or caustic, in the basic solution is preferably NaOH, $Na_2CO_3$, or $K_2CO_3$, in this order of preference but not exclusive to these reagents. The influent stream can range from 10-100,000s of ppm ammonia with similar or lower levels of potassium, with other ions not participating in the reaction. Influent and the basic solution are pumped into at least one of the packed columns until breakthrough of ammonia occurs, the packed columns are regenerated by heat and vacuum to expel the captured ammonia and water vapor, and the fresh column may be inserted back into the ammonia capture and recovery system. The embodiment provided in FIG. 3 shows an implementation for coke oven gas (COG) cleaning that uses a water column to strip the ammonia out of the COG, then an ammonia capture and recovery system in accordance with the present invention is used to remove ammonia and recover the stripper water. It is understood that the present ammonia capture and recovery system may be used in a wide variety of operations where ammonia is desired to be removed from an aqueous stream.

Although struvite is useful as a fertilizer, it is sometimes more valuable to recover the ammonia and reuse or sell it. For regeneration of the struvite, the reaction may start with a mixture of MP and MAP along with traces of magnesium potassium phosphate (MKP) along with residual non-sorbed water. This mixture is then heated between 50° C. and 100° C. and/or a vacuum is applied below 1 ATM. Increases in vacuum reduce the need for heat and vice versa. Residence time is held for between 10-10,000 minutes, most preferably 30-90 minutes. Vapor-phase ammonia and water off-gas off the solid and can be collected for use or further purification. The resulting MP and MKP can then be recycled back into an ammonia sorber in the ammonia capture and recovery system. This process can be repeated indefinitely since the magnesium and phosphate off-gassing at these conditions is minimal to nonexistent.

Figure 4:
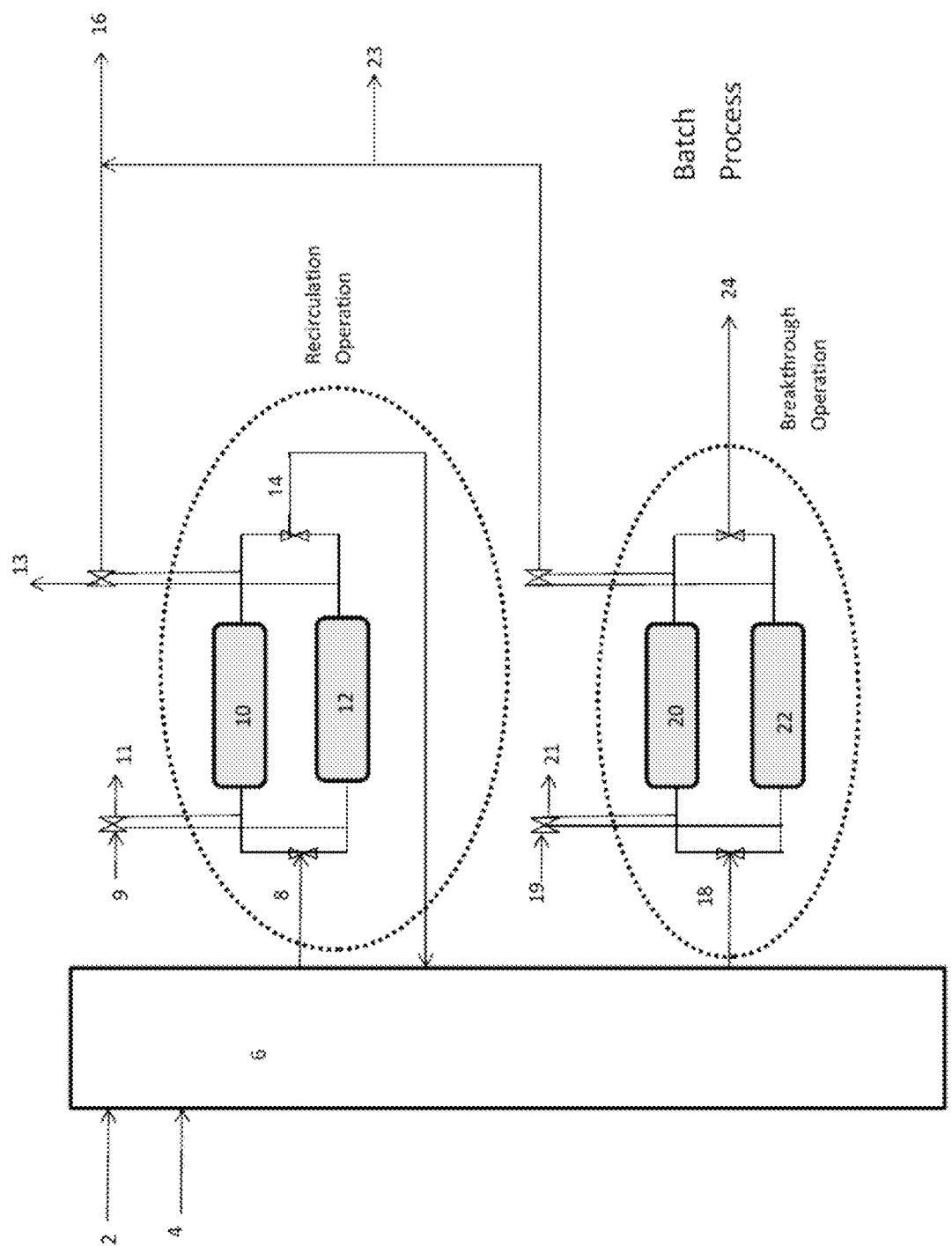
FIG. 4 is a schematic representation of the ammonia capture and recovery system in a batch flow process in accordance with one embodiment of the present invention.
Figure 5:
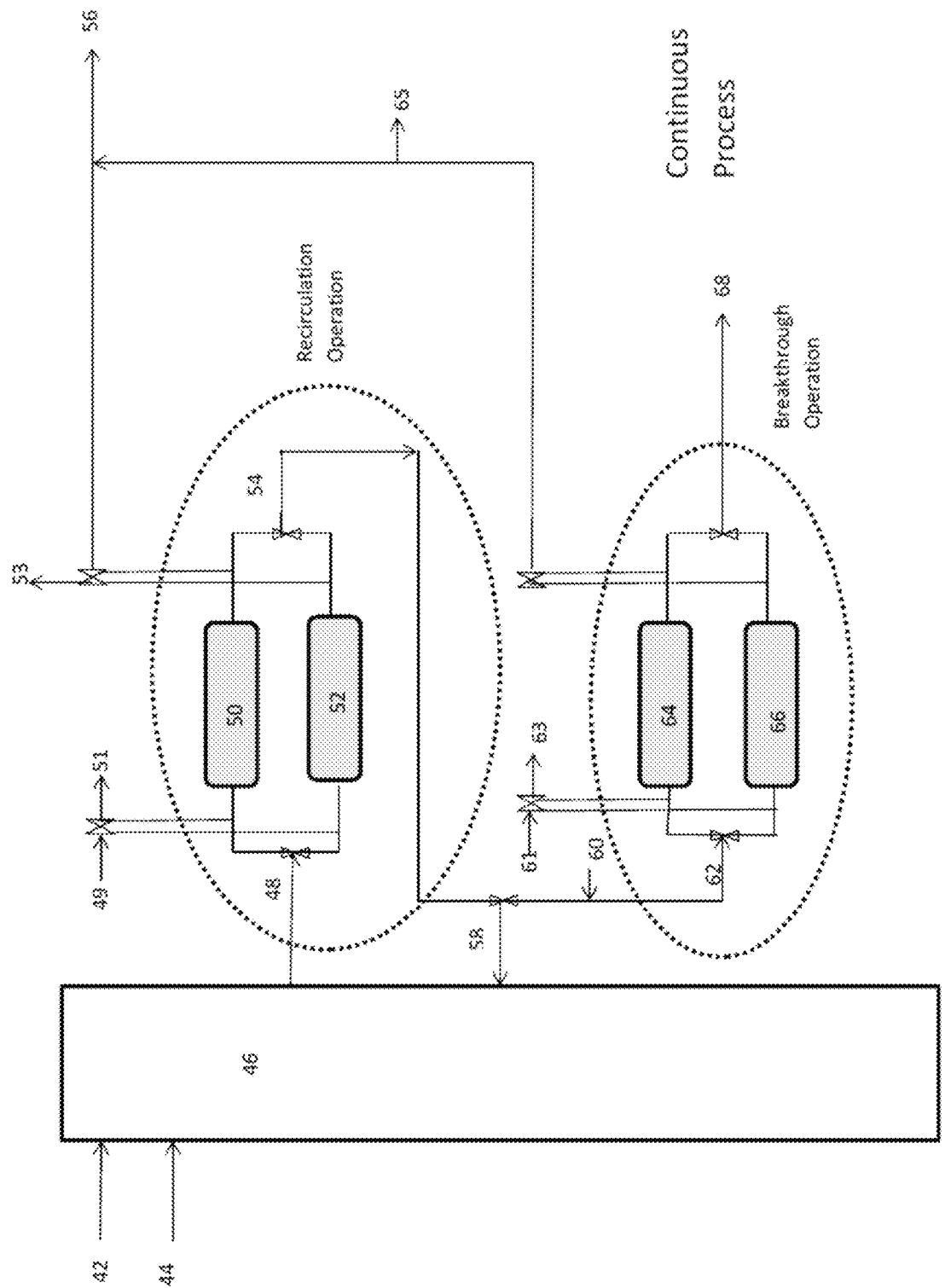
FIG. 5 is a schematic representation of the ammonia capture and recovery system in a continuous flow process in accordance with one embodiment of the present invention.

As seen in FIGS. 4 and 5, the ammonia capture and recovery system may be operated in a recirculation operation and/or a breakthrough operation.

Recirculation operations are those in which a set of recirculation packed columns is operated for bulk ammonia removal flux at the cost of effluent quality. The recirculation packed columns are switched over when the amount of ammonia kg/kg bed-hr reaches a critical amount, depending on the process desired. The influent stream to each recirculation packed column includes as high of a concentration of ammonia as possible, preferably at pH 8.5-9.5, depending on concentration of ammonia and potassium. If ammonia ppm is below 50 ppm then the recirculation operation is not needed, and just a breakthrough operation may be used. The contact time in the recirculation operation is as short as possible to prevent effluent pH from dropping below 8.5. This is a function of bed capacity and ammonia concentration, preferably 0.1-10 seconds. The recirculation operation is meant for multiple passes of wastewater after pH correction and possible additions of more "fresh" wastewater, depending on the process. Multiple fast passes are more effective than fewer slow passes due to the kinetics at this ideal pH range. Removing 1000+ ppm of ammonia can take dozens of passes. Recirculation pumps feeding into an active recirculation packed column should have an adjustable flowrate to control effluent pH above 8.5. pH influent and dosing of caustic pumps should be a variable of effluent ammonia concentration. Higher concentration, and lack of potassium, can allow higher influent pH, but lower concentrations can allow longer passes which need less additional pH adjustment. Regeneration of the recirculation packed column occurs when ammonia flux decreases below critical amount or pH drops below 0.05 at the lowest sustainable flowrate.

Breakthrough operations are those in which a set of breakthrough packed columns is operated for best (lowest) effluent $Mg/NH_4/PO_4$ concentration at the cost of bulk ammonia removal flux. Breakthrough packed columns are switched over when the effluent $Mg/NH_4/PO_4$ concentration goes above a critical amount, depending on process requirements. The amount of ammonia in the influent is preferably below 50 ppm ammonia. If effluent requirements don't require below 50 ppm, then just use the recirculation operation. The contact time is up to infinity, but likely between 10-100 seconds. Increased contact time at terminal ammonia removal doesn't do anything, but doesn't harm the system. The breakthrough operation is preferably a single pass operation. The ammonia pH determines influent pH via addition of a basic solution (e.g., NaOH or similar). Effectively, a calculation is performed where there is just enough alkalinity to allow all the ammonia to be removed while reaching the minimum solubility of MP which is near 8.75 pH. Too high of a pH increases the effluent ammonia concentration (and $Mg/PO_4$ concentration) due to bed dissolving to reach solubility point. The same thing happens if the pH of the influent is too low. Contact time can be variable as long as equilibrium is reached before the fluid exits the packed column. The breakthrough packed column is regenerated when effluent $Mg/NH_4/PO_4$ concentration increases above minimal solubility numbers due to lack of available MP sites.

In one embodiment, the breakthrough packed column absorber influent has a proportional 0.005-.02 pH increase of influent stream per ppm of ammonia in said influent stream via modulating the amount of said basic solution added to said breakthrough influent stream to arrive at an effluent pH setpoint. As shown in the table below for added ammonia in influent, enough base needs to be added to raise the pH to counteract the pH loss due to ammonia removal, which is proportional to ammonia in the influent, since effluent concentration will be as close to solubility point as possible (assuming that the temperature has not significantly changed). The ratio of pH increase to ammonia in influent is 0.005-0.02, preferably about 0.01.

| influent ppm NH4 | influent pH | effluent pH | Effluent ppm NH4 |
|---|---|---|---|
| 1 | 8.75 | 8.75 | 1 |
| 5 | 8.79 | 8.75 | 1 |
| 10 | 8.84 | 8.75 | 1 |
| 20 | 8.94 | 8.75 | 1 |
| 30 | 9.04 | 8.75 | 1 |
| 40 | 9.14 | 8.75 | 1 |
| 50 | 9.24 | 8.75 | 1 |

The overall system includes supporting filters, valves, pumps, and other instrumentation to allow ammonia removal from one stream and a concentrated ammonia product in another. The overall system may be operated with one packed column that provides a piece-meal absorption and regeneration process occurring separately (and requiring batch operation). If two or more packed columns are used, ammonia may be removed from one stream and concentrated ammonia produced from a separate stream. A plurality of packed columns (e.g., a dozen) can be used to allow proper duty cycle sizing. For example, if the absorption life cycle is 4 hours and regeneration takes 1 hour, then 6 packed columns would allow 5 to absorb and 1 to regenerate at any time to allow maximum use of available capacity. Spare packed columns can also be kept for high load/failure situations.

The feed to the system can contain ammonia and various other salts. Potassium loading affects influent pH setpoint. The system ignores other salts including sodium, sulfates, and organics. The system will uptake/remove $Mg/PO_4$ if their influent concentration is higher than MAP solubility at the pH. This "builds" more MAP crystals which allows the bed to increase in size/mass over time. Wastewater that contains well under 10 ppm of $Mg/PO_4$ will cause the bed to erode over many 1000's of bed volume, which can be replenished by adding more media.

Regardless of packed column operation, it is preferred that the pH should not be below 8.5 anywhere in the system, including the effluent. Solubility of MP/MAP in the system increases exponentially below this point and causes the packed columns to dissolve into the effluent. In addition, influent pH about 9.5 increases potassium uptake on the MP/MAP solid, and with high potassium loading a maximum pH of as low as 9 can be considered. Even without potassium in the feed, the solubility increases at these higher pH's which combined with lowering pH inside the packed column causes spontaneous crystal formation of MAP which creates fine particles and massively increased backpressure, leading to lower flow-rates (to prevent bursting) which causes pH to drop too much, leading to system failure.

Contact time within the packed columns depends on whether the system is operating in a recirculation operation or a breakthrough operation. The recirculation operation preferably ranges from 100 milliseconds to several seconds, depending on concentration and remaining capacity of the MP/MAP packing material.

The Length/Diameter (L/D) ratio of the packed columns in the recirculation operation is preferably below 2:1, even below 1:1. The L/D ratio of the packed columns in the breakthrough operation is preferably 6:1 or greater. It is possible to design a packed column bed to meet both operations, e.g., 2-3:1 ratio).

After absorption stops in the packed column due to lack of capacity/kinetics in the recirculation operation or breakthrough of ammonia on the effluent in the breakthrough operation, the packed column can be rinsed with water to back-recycle into influent and purge with inert gas to "dry" the packed column.

In one embodiment, the regeneration operation is typically performed at 100° C. for 10-100 minutes, with a fast (a couple minutes) approach to setpoint. Purge gas at a flowrate of about 1000 bed volume per hour (BV/hr) will pull off any ammonia and water fraction with some chromatographic separation expected. The ammonia fraction (with some water) is collected for further processing. The water heavy fractions are preferably recycled. Alternatively, regeneration may be accomplished at 100° C. to produce fine particles (under 50 microns) which have excellent kinetics/capacity, but poor backpressure (high energy required to meet required flow to maintain pH gradient). Lower regeneration temperatures (e.g., 50° C.) or vacuum regeneration at even lower/room temperatures can be used with higher contact times (e.g., up to 24 hours or more) and will produce larger particles that are still smaller than what is put into the system. If enough packed columns are available in a given operation, more packed columns can be dedicated to regeneration at milder conditions with longer times. This allows the fewer absorbing packed columns to have larger media resulting in less backpressure. This can save on operating expenses and column thicknesses due to lower pressure requirements.

If desired, the resulting "spent" MP/MAP packed columns can have their packing material emptied and used as fertilizer. This fertilizer will selectively have its ammonia reduced via plant uptake, and if recovered can be placed back into the packed columns for further absorption activities. This is very slow (e.g., weeks) but could work for a batch process with low cycle requirements and large enough tank storage.

Packed columns in the recirculation operation are operated at a high flowrate to keep pH in a safe zone, preferably between 8.5-9.5, and have very high ammonia fluxes/kinetics, but their effluent is still high in ammonia. Recirculation allows pH control and re-dose of alkalinity to allow a set of packed column volumes to remove at least 50 ppm ammonia in a short amount of time, preferably less than one minute, alternatively less than one second at minimal backpressure. Breakthrough operations are only used if one pass can get maximum/terminal ammonia removal (i.e., down to solubility point) below 10 ppm MAP in solution. These breakthrough columns may be run at "infinite" contact time (i.e., likely a couple minutes, could be short as a couple seconds) however, at low backpressure and preferably having a high L/D ratio for the column to prevent channeling. Conversely, packed columns in the recirculation operation do not need a high L/D ratio and need to avoid it since backpressure is bad and channeling has little effect after dozens of passes. Flux is low but inconsequential with the recirculation packed column doing most of the "work." The breakthrough packed column simply allows the target effluent concentration to be reached, if possible, and remove residual alkalinity from the system. These recirculation packed columns and breakthrough packed columns are interchangeable in operating but specialization is recommended.

The batch process starts with a feed slug at a given ppm ammonia. Basic, such as NaOH, is dosed to maintain a batch/influent pH for optimal operation. A recirculation operation is operated to simply remove as much ammonia from the batch slug as fast as possible via high flow rate and pH control. Swapping of packed columns for regeneration is done when prudent. Once the batch preferably reaches 50 ppm or so at pH 9 this set of packed columns or a breakthrough set of packed columns with higher L/D ratio is then operated. The pump flow initiated for the required contact time is higher than in the recirculation process to produce an effluent of minimal Mg/NH4/PO4 concentration at the ideal solubility pH (near 8.75) and slowly drains the batch and produces a treated product, preferably having less than 10 ppm Mg/NH4/PO4. This breakthrough mode of operating has high pumping requirements but should be volumetrically efficient.

FIG. 4 shows a preferred batch operation in which ammonia is removed from a wastewater stream using both a recirculation operation and a breakthrough operation. The batch process uses one or more packed columns to treat an initial quantity of ammonia containing wastewater to produce (over time) a stream of effluent water with reduced ammonia content to fill another vessel or be disposed of Ammonia containing wastewater 2 is collected in a feed tank 6 until the tank is filled or filling stops for any reason. This tank 6 is well mixed to allow a uniform ammonia ppm and pH. The pH is corrected to between 8.5-9.5 depending on multiple variables by adding basic 4. All of the packed columns mentioned herein are provided with packing material having a surface of solid magnesium phosphate (MP) or solid magnesium ammonium phosphate (MAP) or both. In practice, the recirculation packed columns are used as ammonia sorbers and/or regeneration columns. During ammonia absorption, recirculation packed columns 10, 12 are subject to the wastewater influent stream 8 that draws fluid from the feed tank 6 to convert at least some of the solid magnesium phosphate on the surface of the recirculation packing material to solid magnesium ammonium phosphate on the surface of the recirculation packing material resulting in a recirculation packed column absorber effluent stream 14 having a reduced amount of ammonia compared to the wastewater influent stream 8. The recirculation packed columns 10, 12 are preferably connected to a recirculation water feed 9 and a recirculation purge 11. Once the ammonia flux in the recirculation packed columns 10, 12 decreases a certain amount (depending on vessel sizing/duty), the recirculation packed columns 10, 12 are removed from contact with the wastewater influent stream 8 and subjected to a recirculation regeneration temperature above 50° C., preferably between 50-100° C., or a recirculation regeneration pressure below 1 ATM or both to convert at least some of the solid magnesium ammonium phosphate on the surface of the recirculation packing material to solid magnesium phosphate on the surface of said recirculation packing material and regenerated vapor-phase recirculation ammonia and water. The regenerated vapor-phase recirculation ammonia and water are then purged from the recirculation packed column. As such, the recirculation packed column absorber effluent stream 14 is preferably connected to a recirculation rinse effluent 13 and ammonia outlet 16. Once the packed column has the majority of ammonia removed (diminishing returns after 50-80% ammonia removal) it is then placed back into the system and connected to the wastewater influent stream 8. Each of the recirculation packed columns is capable of cycling between ammonia absorption and column regeneration. The recirculation packed column absorber effluent stream 14 may be recycled back to the feed tank 6 and well-mixed with further pH correction. Over time, the amount of ammonia in the feed tank 6 decreases. A final pH dosing may be performed prior to beginning the breakthrough operation. The breakthrough operation uses breakthrough packed columns as ammonia sorbers and/or regeneration columns. Once a set amount of ammonia has been removed from the recirculation operation (e.g., 50 ppm ammonia remaining in the feed tank 6) breakthrough packed columns 20, 22 are subject to the breakthrough influent stream 18 that draws fluid from the feed tank 6 one last time, preferably at a lower flowrate than used during the recirculation operation, to further convert at least some of the solid magnesium phosphate on the surface of the breakthrough packing material to solid magnesium ammonium phosphate on the surface of the breakthrough packing material resulting in a breakthrough packed column absorber effluent stream 24 having a reduced amount of ammonia compared to the breakthrough influent stream 18. The breakthrough packed columns 20, 22 are preferably connected to a breakthrough water feed 19 and a breakthrough purge 21. During regeneration, the breakthrough packed columns 20, 22 are subjected to a breakthrough regeneration temperature above 50° C. or a breakthrough regeneration pressure below 1 ATM or both to convert at least some of the solid magnesium ammonium phosphate on the surface of the breakthrough packing material to solid magnesium phosphate on the surface of the breakthrough packing material and regenerated vapor-phase breakthrough ammonia and water. The regenerated vapor-phase breakthrough ammonia and water are then purged from the breakthough packed column. As such, the breakthrough packed column absorber effluent stream 14 is preferably connected to a breakthrough ammonia outlet 23. Each of the breakthrough packed columns is capable of cycling between ammonia absorption and column regeneration. It is important to understand that additional water may be added to the packed columns. Additionally, air and/or nitrogen may be purged from the packed columns in any manner known to those of skill in the art. Valves may be supplied to the system as necessary to handle the various flow streams along with pumps, pH monitors, temperature monitors, and ammonia level meters. When the batch is finished, the breakthrough packed column absorber effluent stream 24 preferably has below 10 ppm NH4/Mg/PO4 and a highly concentrated ammonia outlet 16 with more than 10% ammonia produced, as long as any packed column is regenerated. The ammonia in the ammonia outlet 16 may be collected for further purification and process reuse.

Another way to treat ammonia-containing wastewater is a continuous process. Here, a flowrate of a certain concentration of ammonia is fed continuously (variable flowrate/duty cycle/strength is allowed) into a buffer tank (smaller than a batch tank above). Packed columns under recirculation operation operate continuously/when needed to maintain a constant ammonia flux removed from the system/buffer tank concentration. The packed columns in the recirculation operation simply have to remove as much ammonia mass as the influent puts into the system (mass balance), minus what the breakthrough columns can handle. Buffer tank ammonia concentration has a small gradient to allow the packed columns in the recirculation operation to operate. For example, the packed columns in the recirculation operation take their influent from the top where the ammonia feed is constantly placed. This allows a higher (still diluted somewhat by the buffer tank) influent to allow the packed columns in the recirculation operation to produce a lower ammonia effluent to "dilute" out the buffer tank. This effluent is placed near the bottom of the buffer tank. Unlike the batch tank this buffer tank doesn't need much/any mixing where the breakthrough column operates. As long as the local concentration/pH of the buffer tank is ideal, the breakthrough column operates at a flowrate approximately equal to the flowrate into the buffer tank. Packed columns in the recirculation operation have little effect on tank liquid balance, so it needs to be sized accordingly to get terminal treatment conditions mentioned above. This whole process reaches a continuous mass balance of ammonia into buffer tank=ammonia coming off recirc+breakthrough columns during regeneration with liquid balance being liquid into buffer tank=liquid out of buffer tank=liquid into breakthrough column (recirc in =recirc out cancels out). This process has lower flowrates and pumping energies and can handle process perturbations and has smaller liquid vessel sizes; however, the kinetics/flux are poor so the packed columns need to be sized larger.

FIG. 5 shows a preferred continuous operation in which ammonia is removed from a wastewater stream using both a recirculation operation and a breakthrough operation. The buffer tank 46 is initially filled with some water, but not actively mixed. Initial ammonia-containing wastewater 42 enters the buffer tank 46 until the amount of ammonia present is about 100 ppm. Once this happens, the recirculation operation begins until the recirculation packed column absorber effluent stream 54 has about 50 ppm ammonia. The pH of the buffer tank 46 may be adjusted using basic 44 to keep the wastewater influent stream 48 around a 9-9.5 pH. Over time, this creates a constant recirculation packed column absorber effluent stream 54 near 50 ppm and a gradient in the buffer tank 46. Contact time and influent pH are adjusted to control the gradient spread and keep the recirculation packed column absorber effluent stream 54 below 50 ppm. All of the packed columns mentioned herein are provided with packing material having a surface of solid magnesium phosphate or solid magnesium ammonium phosphate or both. In practice, the recirculation packed columns 50, 52 are used as ammonia sorbers and/or regeneration columns. During ammonia absorption, recirculation packed columns 50, 52 are subject to the wastewater influent stream 48 that draws fluid from the buffer tank 46 to convert at least some of the solid magnesium phosphate on the surface of the recirculation packing material to solid magnesium ammonium phosphate on the surface of the recirculation packing material resulting in a recirculation packed column absorber effluent stream 54 having a reduced amount of ammonia compared to the wastewater influent stream 48. The recirculation packed columns 50, 52 are preferably connected to a recirculation water feed 49 and a recirculation purge 51. During regeneration, the recirculation packed columns 50, 52 are subjected to a recirculation regeneration temperature above 50° C. or a recirculation regeneration pressure below 1 ATM or both to convert at least some of the solid magnesium ammonium phosphate on the surface of the recirculation packing material to solid magnesium phosphate on the surface of said recirculation packing material and regenerated vapor-phase recirculation ammonia and water. The regenerated vapor-phase recirculation ammonia and water are then purged from the recirculation packed column. As such, the recirculation packed column absorber effluent stream 54 is preferably connected to a recirculation rinse effluent 53 and ammonia outlet 56. Each of the recirculation packed columns is capable of cycling between ammonia absorption and column regeneration. The recirculation packed column absorber effluent stream 54 may be returned to the buffer tank 46 via recirculation return 58 or directed to the breakthrough operation, which uses breakthrough packed columns as ammonia sorbers and/or regeneration columns. Once a set amount of ammonia has been removed from the recirculation operation (e.g., 50 ppm ammonia remaining in the recirculation packed column absorber effluent stream 54) breakthrough packed columns 64, 66 are subject to the breakthrough influent stream 62 that draws a fraction of fluid from the recirculation packed column absorber effluent stream 54 to further convert at least some of the solid magnesium phosphate on the surface of the breakthrough packing material to solid magnesium ammonium phosphate on the surface of the breakthrough packing material resulting in a breakthrough packed column absorber effluent stream 68 having a reduced amount of ammonia compared to the breakthrough influent stream 62. As long as the recirculation operation can keep a steady ~50 ppm ammonia in the recirculation packed column absorber effluent stream 54, and remove as much ammonia as the wastewater influent stream 48 adds, this process can operate indefinitely until maintenance is required. Breakthrough basic 60 may be added to the breakthrough influent stream 62 prior to reaching the breakthrough packed columns 64, 66. The breakthrough packed columns 64, 66 are preferably connected to a breakthrough water feed 61 and a breakthrough purge 63. During regeneration, the breakthrough packed columns 64, 66 are subjected to a breakthrough regeneration temperature above 50° C. or a breakthrough regeneration pressure below 1 ATM or both to convert at least some of the solid magnesium ammonium phosphate on the surface of the breakthrough packing material to solid magnesium phosphate on the surface of the breakthrough packing material and regenerated vapor-phase breakthrough ammonia and water. The regenerated vapor-phase breakthrough ammonia and water are then purged from the breakthrough packed column. As such, the breakthrough packed column absorber effluent stream 68 is preferably connected to a breakthrough ammonia outlet 65. Each of the breakthrough packed columns is capable of cycling between ammonia absorption and column regeneration. This process has a lot of dynamics. The ammonia concentration at the top and bottom of the buffer tank 46 can vary, as well as the liquid level. This requires a flow-rate/contact time of the recirculation packed columns 50, 52 to vary. Ideally, multiple packed columns would be available for the recirculation operation to handle the highest duty possible, with excess packed columns under regeneration/idle. The recirculation packed column absorber effluent stream 54 can vary and causes the pH of the breakthrough influent stream 62 to vary, which must be compensated. Within the recirculation packed columns 50, 52 and breakthrough packed columns 64, 66 the gross flux and contact time required changes as a function of the packed column's remaining ammonia capacity which decreases over time. Process variables need to be modified on how "fresh" a packed column is, then adjusted again when a "new" packed column is placed in service. With many packed columns these perturbations can be minimized. It is important to understand that additional water may be added to the packed columns. Additionally, air and/or nitrogen may be purged from the packed columns in any manner known to those of skill in the art. Valves may be supplied to the system as necessary to handle the various flow streams along with pumps, pH monitors, temperature monitors, and ammonia level meters.

In a preferred embodiment, prior to absorption, the influent for each of the packed columns is subjected to a pH adjustment using basic so that the effluent stream of the packed column is maintained at a pH between 8.5-9.5.

In a preferred embodiment, each of the packed columns has a packing density of the column above 1 kg of the packing material having a surface of solid magnesium phosphate or solid magnesium ammonium phosphate per liter packed column volume.

In a preferred embodiment, at least 50 ppm ammonia is removed from the wastewater influent stream in less than one minute of contact time. In another embodiment, at least 50 ppm ammonia is removed from the wastewater influent stream in less than one second of contact time.

In one embodiment, the recirculation packed material is removed from the system and provided as fertilizer for plants, whereby at least some of the solid magnesium ammonia phosphate is converted back to solid magnesium phosphate, yielding plant-regenerated packing material. Preferably, the plant-regenerated packing material provides plant-regenerated recirculation packing material.

In one embodiment, the flow rate of the wastewater influent stream is adjusted within at least one of the recirculation packed column such that a pH drop between the ammonia in said wastewater influent stream and said recirculation packed column absorber effluent stream is between 0.05-0.5 while maintaining a backpressure below a maximum allowable working pressure of at least one of said recirculation packed columns.

The packing material may be selected from particles or modified random packing material to act as active sites for the reaction between MP and MAP. Random packing, such as Raschig rings, Pall rings, Intalox saddles, and many other designs, are historically inert media that helps increase surface area for mass transfer operations. The inert random packing material can be coated with a magnesium material and exposed to a dilute phosphoric acid solution to produce MP particles on the surface of these packings. The surface area is an order of magnitude less than a 100-200 micron packed bed, and the capacity is reduced 30 fold, but the kinetics and backpressure would improve by an order of magnitude of 1 to 3. Ideally, the particle size is below 300 microns since lower particle size has higher capacity/kinetics, but higher backpressure. Particles tend to amalgamate over time and backpressure further increases. Proper pH control reduces this effect.

The ammonia capture and recovery system may be used in conjunction with an overall wastewater treatment system. The overall wastewater treatment system may include a minimum of four modular steps that take urine, hygiene water, humidity condensate, and laundry water and extract water out of them. The wastewater treatment system is also capable of carbon dioxide scrubbing, brine recovery, nutrient recovery, chemical production, and nitrogen gas production. The main goal of the wastewater treatment system is to have the system run in an open loop configuration that converts urea to nitrogen/ammonia gas and stores brine to a closed loop brine recovering system with hydroponic system integration with minimal modifications to said system.

As shown in FIG. 2, the first stage of the wastewater treatment system includes a urea hydrolysis step that can accept any unit operation that converts urea to ammonia and $CO_2$ in an aqueous solution. Examples of such operations for the first stage include, but are not limited to, thermochemical urea decomposition (reverse reaction compared to the Bosch urea process) or using biological urea hydrolysis and TOC removal. The second stage of the wastewater treatment system is an ammonia transformation step that takes aqueous ammonia and converts it to nitrites, nitrates, nitrogen gas products, or otherwise sorbs it from the wastewater. This second stage preferably includes the previously disclosed ammonia capture and recovery system. The third stage is the water removal step that uses any technology that separates water from the remaining brine including, but not limited to, distillation of any type, direct or reverse osmosis, pervaporation, nanofiltration, picofiltration, or brine purification using electrodialysis. The fourth stage is a brine recovery step that separates or transforms the remaining brine into useful chemicals and allows a recycle stream to go back to the third stage for enhanced water recovery. This fourth stage includes, but is not limited to, brine storage, brine dewatering through pervaporation or electrolysis, selective ion exchange for nutrients, and bipolar membrane electrodialysis (chlor-alkali) of brine salts. The chemicals produced in the fourth stage can be used for the first, second, third, and fourth stage to increase unit operation performance or regenerate ion exchange resins needed in this process or elsewhere and therefore reduce the consumable requirements of the system. Excess chemicals can be stored for later use or upgraded into more useful chemicals if the scale is large enough. Ion exchange resin regeneration is mostly for hydroponic systems; without them it becomes the system's largest "waste" product, which is a small fraction of previous architecture's waste streams. The specific technology used in each stage is relatively independent of the other stages, allowing the freedom to swap them out without affecting the up or downstream process. Just changing the operating conditions of stage 1 or 2 can allow different products to be produced without any hardware changes. Unit operations for each of the stages are chosen for their synergy with each other more than their individual efficiencies.

Stages not specifically included are hydroponic systems for plant/food production and water polishing, which are dependent on the wastewater treatment system demands with the previous four stages optimized for their specific inclusion.

The following examples are used to illustrate the beneficial results that are obtained using the present ammonia capture and recovery system. However, it should be understood by one of ordinary skill in the art that the system may be modified from these preferred embodiments without departing from the scope of the present invention.

Example 1—Ammonia Sorber

A 1 liter fluidized bed reactor is run in a batch mode. The influent contains 1 gram/liter ammonia-N at a starting pH of between 7 and 8. The reaction is started by fluidizing the bed according to the ergun equation. The bed material is made up of magnesium phosphate crystals of mean particle size of 300 microns with a $Mg:PO_4:NH_3$ ratio of 1.5:1.5:1. The bed is fluidized for between 1-3 hours until desired ammonia removal is reached. To quench the reaction the fluidization is ceased and the resulting mixture is drained from the reactor and filtered with a sieve. The crystals are collected for analysis or fertilizer use while the liquid is reduced in ammonia composition for further treatment. One hour of contact time with proper fluidization can reach 70% ammonia removal from the influent with the above parameters. pH is maintained at ~8.5 using 1M NaOH or $K_2CO_3$ additions using bang-bang control with a deadtime of 5 minutes using 1 ml pulses of caustic.

Example 2—Ammonia Sorber (Single Pass)

One liter plug flow reactor contains 1 kilogram of magnesium phosphate crystals at mean particle size of 100 microns packed on both sides with glass filters of mean pore size of 10 microns. Sufficient room is allowed for liquid contact and expansion of the particles when they sorb ammonia and water. 1 gram/liter ammonia-N containing wastewater is pumped into the reactor at between 0.1-100 bed volumes/hour and effluent is collected on the other side. Caustic is added to the influent and is controlled by pH setpoint of 8.5 at the effluent. When pH of the effluent dips below the setpoint, caustic is added to the influent in pulses, with the setpoint check at 5 minute intervals. The caustic of choice is NaOH at 1M concentration. When ammonia breakthrough is detected by an ammonia-sensitive ion selective probe or similar method, the plug flow reactor/column is swapped out for a fresh column. The column materials can be used as fertilizer or regenerated.

Example 3—Ammonia Sorber (Multipass)

A 1 liter plug flow reactor contains 1 kilogram of magnesium phosphate crystals at mean particle size of 100 microns packed on both sides with glass filters of mean pore size of 10 microns. Sufficient room is allowed for liquid contact and expansion of the particles when they adsorb ammonia and water. 1 gram/liter ammonia-N containing wastewater is pumped into the reactor at between 1-10 bed volumes/hour and recirculated back into the column. Caustic is added to the influent and is controlled by pH setpoint of 8.5 at the effluent. When pH of the effluent dips below the setpoint, caustic is added to the influent in pulses, with the setpoint check at 5 minute intervals. The effluent is routed back as an influent in a closed loop. When ammonia concentration in the plug flow reactor loop fails to decrease, the column is swapped out for a fresh column. The column materials can be used as fertilizer or regenerated.

Example 4—Regeneration of the Struvite (MAP)

A one liter plug flow reactor made of stainless steel is sorbed to breakthrough with struvite crystals or MAP. The column can be removed from the adsorption apparatus or otherwise cut off from it using valves. 29 inches of mercury vacuum are introduced along with heat at 75° C. provided by copper heating plates. After 30 minutes, 50% of the struvite has reverted to MP. This column can be reintroduced to the absorption apparatus, and this process can be repeated. The ammonia and water vapor are vented but can be condensed and reclaimed.

Example 5—Regeneration of the Struvite (MAP)

Similar to Example 4, but with the crystals from a fluidized bed reactor (FBR) placed into said stainless steel column and the above performed on it.

Example 6—Regeneration of the Struvite

Using International Space Station wastewater influent (66 Liters per day with 1.5 grams/liter $NH_3$—N) that has had its urea component hydrolyzed into ammonium. With a 2 L plug flow reactor with 2 kilograms of MP contained within, this influent is pumped in at 3 L/hr (1.5 BV/hr) with a stoichiometric amount of 1 NaOH added to keep the effluent pH about 7 while maximizing conversion. After 22 hours, the bed is regenerated by being removed from the loop and exposed to heat at 75° C. at 29 inches of mercury vacuum for 2 hours. After removing 50% of the ammonia the bed is replaced and the adsorption is resumed. Wastewater is not generated constantly on the ISS so the regeneration step can be done when zero wastewater is generated (e.g., when all the crew are asleep).

Example 7—Regeneration of the Struvite (Carousel Style)

As provided in Example 6, but with three 1 L plug flow reactors containing 1 kg MP. Two of these columns are placed in series while the third column is being regenerated using the above parameters. The influent at pH 8.5 is run through the first column without caustic while caustic is added between the two columns to maintain a second column effluent pH of 7.5. A pH probe and ammonia probe are used downstream to moderate the caustic additions and to detect breakthrough respectively. When the first column reaches breakthrough it is then regenerated with the second column becoming the first column while the regenerated column becomes the second column. This process can be repeated indefinitely.

Example 8—Wastewater Treatment System

An influent containing urine, humidity condensate, and hygiene water (1200 ppm TOC, 1400 ppm TN) enters a urea hydrolysis hollow fiber membrane bioreactor. After 1 day of residence time the urea is broken down into ammonia and carbon dioxide to completion with most (95%+) of the organics consumed in the process. The effluent ammonia stream is then sent to an ammonia sorber. Magnesium phosphate dibasic trihydrate (MP) particles in a column selectively sorb/react to form magnesium ammonium phosphate hexahydrate (i.e., struvite or MAP) while not interfering with other dissolved ions (save for potassium, but only in trace amounts). The bed is long enough to offer 96.5% removal of ammonia and support at least one bed volume of liquids before regeneration. Struvite regeneration involves taking the loaded column out of the wastewater loop and applying heat and vacuum (at least ambient temperature and 29 inches of mercury vacuum or at 50° C. and regular pressure) for a nominal period of time (e.g., 30 minutes) to flash off ammonia and water vapor (for use in refrigeration or plant systems). The regenerated column is then returned to service, and this can be performed in a carousel configuration. Effluent from the ammonia absorption column can then be sent to a suitable water separator (e.g., vapor compression distillation). 95% of the influent treated wastewater becomes distillate (containing the bulk of the residual organics, residual ammonia, and trace nonvolatiles). The remaining bottoms contain the rest of the nonvolatile salts and inorganics along with some water. The distillate is sent to the water polisher. The bottoms are then sent to a brine-dehardener ion exchange resin column containing a sufficient volume of sodium loaded Amberlite IRC747 or similar chelating cation exchange resin. The resin selectively sorbs divalent cations (e.g., calcium and magnesium) over other cations and swaps them for 2 sodium cations each. This column is of a length to allow 99% hardness removal for over one bed volume of operation. The resulting dehardened brine is then sent to the bipolar membrane electrolyzer. Using specific membrane pairs, this electrolyzer converts the influent sodium, potassium, phosphate, sulfate, and chloride containing stream into an acid and base stream, along with a weakened brine stream. The acid stream consists of hydrochloric, sulfuric, and phosphoric acid with the former dominating while the base stream consists of sodium and potassium hydroxide with sodium hydroxide being the slight majority. The weakened brine stream is recycled back to the water separation step to increase water recovery. The resulting acid stream is used in the first regeneration step of the de-hardened resin to produce magnesium and calcium chloride while the base stream is used to convert the brine de-hardening resin from the hydrogen to the sodium form, which produced water. Base is also consumed in this ammonia recovery system. The acid and base can also be used for resins located in the water polishing section, or to stabilize wastewater while the system is non-functional.

Example 9—Wastewater Treatment System with Brine Processing

An influent containing urine, humidity condensate, and hygiene water (1200 ppm TOC, 1400 ppm TN) enters a urea hydrolysis hollow fiber membrane bioreactor (HFMB). After 1 day of residence time, the urea is broken down into ammonia and carbon dioxide to completion with most of the organics consumed in the process. The effluent ammonia stream is then sent to an ammonia sorber. MP particles in a column selectively sorb/react to form magnesium ammonium phosphate hexahydrate (i.e., struvite or MAP) while not interfering with other dissolved ions (save for potassium, but only in trace amounts). The bed is long enough to offer 96.5% or better removal of ammonia and support at least one bed volume of liquids before regeneration. Struvite regeneration involves taking the loaded column out of the wastewater loop and applying heat and/or vacuum for a nominal period of time (e.g., 30 minutes) to flash off ammonia and water vapor (for use in refrigeration or plant systems). The regenerated column is then returned to service, and this can be performed in a carousel configuration. Effluent from the ammonia absorption column can then be sent to a suitable water separator (e.g., vapor compression distillation). Approximately 95% of the influent treated wastewater becomes distillate (containing the bulk of the organics, residual ammonia, and trace nonvolatiles). The remaining bottoms contain the rest of the nonvolatile salts and inorganics. The main goal with the bottoms is to have them sufficiently dried (very low moisture content). The distillate is sent to the water polisher. The dried bottoms are then sent to an electrostatic separator. Using the properties of electrostatics and triboelectric charging, sodium chloride and potassium chloride can be separated from each other with high purity. This process is easier in zero or microgravity environments since these electrostatic forces will tend to dominate. The distribution of the rest of the inorganic salts (potassium, nitrate, and sulfate) is irrelevant since both streams undergo the same post-processing. Preferably, each of the two effluents (sodium salts and potassium salts) is run through separate but identical post processing steps; however, running each salt in separate batches with the same post-processing step is possible. Post-processing involves having the sodium/potassium effluent rehydrated and sent to a brine-dehardener ion exchange resin column containing a sufficient volume of sodium/potassium loaded Amberlite IRC747 or similar chelating cation exchange resin. The resin selectively sorbs divalent cations (e.g., calcium and magnesium) over other cations and swaps them for 2 sodium/ potassium cations each with over 1000:1 selectivity for divalent over monovalent (sodium/potassium) cations. This column is of a length to allow 99% hardness removal for over one bed volume of operation. The resulting dehardened brine is then sent to a phosphate selective ion exchange resin bed packed with Layne RT® anion exchange resin (Layne Christensen Company) or any other sufficiently selective phosphate ion exchange resin. In the hydroxide regenerated form, this resin will swap 3 OHs for 1 phosphate ion. This column is of a length to allow 90% or more phosphate removal over one bed volume of operation. The resulting brine is then sent to a sulfate selective ion exchange resin bed packed with a customized sulfate selective anion exchange resin. In the hydroxide regenerated form, this resin will swap 2 OHs for 1 sulfate ion. This column is of a length to allow 90 or more percent sulfate removal over one bed volume of operation with over 10:1 sulfate selectivity over other anions, specifically chloride. Note that the order of the last 2 anion exchange resin beds can be swapped to be in any order, as long as it is after the hardness reducing resin. The resulting brine is then sent to the bipolar membrane electrolyzer. Using specific membrane pairs, this electrolyzer converts the influent sodium, potassium, and chloride containing stream into an acid and base stream, along with a weakened brine stream. The acid stream consists of hydrochloric acid with additional trace mineral acids while the base stream consists of sodium and potassium hydroxide depending on which batch is processed. The weakened brine stream is recycled back to the water separation step to increase water recovery and also to dilute the electrostatic separated salts back into brine. The resulting acid stream is used in the first regeneration step of the de-hardened resin to produce magnesium and calcium chloride; along with other pH related activities needed in this architecture or other system. Sodium hydroxide is used for the nitrification HFMB as pH control and for the dehardening resin regeneration (only when doing a sodium batch) as well as for ion exchange regeneration in other subsystems. Potassium hydroxide is used to regenerate the phosphate and sulfate anion exchange resin beds, which yields potassium phosphate and potassium sulfate respectively; along with a hydroxide loaded resin bed. The regenerated wastes, along with the ammonia from the struvite regeneration process are then added to a hydroponic system used to grow food crops.

The plant leaching effluents that cannot be added directly back into the hydroponic system are recycled into the urea hydrolysis bioreactor.

Example 10—Wastewater Treatment System

To convert a short term biological/struvite environmental control and life support system (ECLSS) without hydroponics to a long term ECLSS with hydroponics, only a few steps need to be performed. The fertilizer recovery resins (phosphate and sulfate) along with the salt electrostatic separator are then added between the distillation and the brine electrolyser. Preferably, this would be in one rack unit for ease of use. The hydroponic system will then have sources of fertilizer (including ammonia from struvite regeneration, which just needs to be rerouted), along with increased water recovery. This above architecture may require additional caustic and/or acid to run. This can be solved by priming the system with additional acid and caustic since the excess can be recovered using the brine electrolysis hardware. Also the salt in the human diet from delivered food will eventually end up as acid/caustic which would replace any lost to any technically unrecoverable waste stream.

Example 11

Stock Solution Generation:

Preliminary test stock solutions, or ersatz wastewater, were generated in bulk using volumetric flasks. Solutions containing 1000 ppm $NH_4^+$ (from Ammonium Acetate), 1000 ppm $Na^+$ (from Sodium Chloride), and 1000 ppm $K^+$ (from Potassium Chloride) were created and stored at 4° C. until use. Liter aliquot of feed solutions were dosed to a desired pH using 1M NaOH stock solution. The NH4+ concentration was purposefully chosen to be above standard municipal wastewater treatment levels so that it would mimic the effect of long term use in the field and so that testing was done under more extreme conditions. It also happened to be of similar ammonia concentration to mixed wastewater influents found on the ISS. Sodium and potassium were added to the solution so that interactions between the MP, MAP, and these ions could be witnessed. It is supported by the literature that potassium has the potential to form K-Struvite under high pH conditions, and by utilizing a solution with higher than normal concentration, this would provide the correct environment for its formation. K-Struvite is not regenerable using heat and vacuum. Sodium is not known to form side-products with struvite, but since it is chemically similar it could interfere with the formation of MAP. Sodium is also a common component in many wastewater streams. Mass balances will be utilized to identify the presence of potassium in the MAP solid (and the formation of K-Struvite or other products). This will be indicated by both a loss in the liquid and a gain of potassium on the solid.

Ammonia Probe Calibration:

An ammonium probe was selected for use in real time ammonia detection (e.g., Cole-Parmer ISE electrode, ammonium, double-junction, BNC, Item # EW-27502-03). Several calibration curves were generated. A four-point curve consisting of 1000, 100, 10, and 1 ppm NH4+ (ammonium acetate) was generated.

Ion Chromatography

Mass balance data was confirmed using an ion chromatograph (e.g., Dionex ICS-2100 Ion Chromatography System). Ions examined were $Mg^{2+}$, $NH_4^+$, $Na^+$, $K^+$, $Cl^-$, $CH_3CO_2$, and $PO_4^-$. For liquid samples a 1:50 dilution was prepared using ultra-pure deionized (DI) water (980 μL of water; 20 μL of sample). The mixture was filtered using a 0.45 μm filter before being deposited into a 1 ml aliquot for use in the ion chromatograph. Feed samples were also analyzed, but used a 1:100 dilution instead. All solid samples went through an acid digestion process before dilution. Solid samples were mixed with 5 ml of a 5% nitric acid solution (e.g., Nitric Acid Trace Metal grade, Fisher A509-P212) and placed in a heat block set at 95° C. for 10 minutes. The total volume was brought to 50 ml using ultra-pure DI water, and the sample was diluted again, 1:500.

Ball Mill

It was desired to have 3 main cuts (particle size distributions) of particle sizes for testing in equilibrium studies and column runs to determine marginal utility (kinetics at the cost of increased pumping due to backpressure).

Ball Milling procedure: Bulk magnesium phosphate dibasic trihydrate (MP) material was selected to be milled (e.g., Sigma Aldrich 340758). The rough particle size of the unground material was determined to be 350 microns via manual particle measuring under brightfield microscopy. Milling of the product was the most cost and time effective method of getting the desired particle ranges. The MP was milled to 150, 250, and 350 μm.

Equilibrium Testing

Equilibrium tests were conducted in order to further narrow the possible condition setpoints for subsequent column run studies. Variables of interest in this study included pH and particle size. Particles that showed high ammonia removal were deemed more ideal for column runs. Previous work indicated that a pH of 8.5 allowed for highest ammonia removal; however, several pH's were tested in order to better understand the envelope of performance of the MP. Five pH's were investigated: 7.5, 8, 8.5, 9, and 9.5. Each of the three particle sizes produced via the ball milling processed were used: 150, 250, and 350 μm. Each particle size was run in triplicate under each of the previously listed pH conditions. A ratio of 1 N:MP was maintained in all runs conducted, so that if the reaction went to 100% conversion (MP basis), all ammonia would be removed from the solution. In order for the reaction to reach equilibrium, the test run time was selected to be 24 hours.

Equilibrium Methods 15 ml centrifuge tubes containing 98 mg of MP and 10 ml of stock feed solution were set to rotate at a rate of 60 rpm in a laboratory mixer (e.g., Rotator model RKVSD, Appropriate Technical Resources). It was felt that this rotation rate would be sufficient for mixing. The feed solution was dosed once to the appropriate pH using NaOH before its addition to the MP. After the 24-hour contact time, the liquid and solid samples from each tube were separated using a filter stand using a 10 μm glass frit and vacuum flask. After the liquid sample was obtained, the solid sample was rinsed using 10 ml of DI water to remove any remaining liquid sample. Liquid samples' pH were taken after separation from the solid, and the solid samples' weights were recorded. Solid and liquid samples were analyzed using ion chromatography (IC) in order to gather mass balance data. The liquid pH data recorded after the run acts as qualitative means to determine if any ammonia was removed. A drop in ammonia will correspond to a drop in pH.

Equilibrium Results/Discussion

The average post-run liquid pH was 6.43 for all samples initially dosed to 7.5, 8, 8.5, and 9. For samples initially dosed to 9.5, the final liquid sample pH was averaged to be 7.95 due to probably exceeding the pH range where this reaction functions at decent kinetics. Liquid pH was expected to decrease over time due to the removal of ammonia. The data suggested there was a threshold pH below which the reaction could not proceed: pH<6.4. IC analysis revealed that there was still ammonia left in the liquid samples, and from this observation it was concluded that the solutions were alkalinity limited. Struvite cannot precipitate out, or is too soluble below a pH of roughly 6.4. Later tests would demand alkalinity dosing in order to keep the struvite insoluble enough to remain a solid in solution.

It was concluded that the higher the initial starting pH the higher the removal. This is due to the effect of ammonia removal lowering the pH of the solution, causing the struvite to essentially dissolve. The samples where the feed solution was at 9.5 pH could remove more ammonia before the pH dropped below this threshold. Between the three particle sizes examined, the 150 µm particle had the highest average removal at 25.71% although it is within a standard deviation of the 250 and 350 µm. The lack of alkalinity dosing halted the reaction, and it was believed that if the reaction was close to completion (removal of all ammonia in solution) that the difference in removal across the particle sizes would be more distinguished. The data also suggest the number of caustic dosings required to achieve complete removal of ammonia to be 4-5 which will require a non-trivial pH control method.

Time Course Studies

A solid understanding of the kinetics of struvite formation is critical to building a successful column. Several studies were completed to identify the pH with the fastest struvite formation kinetics. This allows for the desired ammonia removal to be achieved while minimizing the column bed length (which reduces capital and operating costs). Fast kinetics lead to smaller vessels and reduced capital expenses. The equilibrium test data indicated that caustic dosing was required for the MP to more completely remove ammonia. The time course studies conducted aimed to capture the rate of reaction before and after a sample was dosed and the kinetics as the particle reached saturation. For these tests a N:MP ratio of 1 was used, and three major studies were conducted: a time course test run, a full-time course run using the three different particle sizes in triplicate (150, 250, and 350 µm) particle sizes, and a pH study utilizing the 150 µm particle size controlled to 3 different pH's: 8.5, 9.5, and 10. The initial test run consisted of a run of each of the three particle sizes that was dosed every 2 hours to the set point of 8.5 pH. The test run was used to define techniques and develop procedures for later runs. The full-time course run was controlled to a pH of 9 and was dosed back to this pH using NaOH. This occurred at every time point (every 30 minutes). The motivation behind the full-time course run was to illustrate the differences between the 3 particle sizes' ammonia removal abilities. It was felt that this property would become more apparent over multiple dosings, because the reaction is no longer alkalinity limited. The pH study was also performed in triplicate, and was dosed at every time point or every 30 minutes.

Methods

The vessels used for time course studies were 20 ml glass jars with stir bars. The jars were placed on a stir plate (e.g., 2MAG Mix 15eco) for the duration of the test. The stir plate speed was set to 1200 rpm for the test run and the pH 9 run, but was later reduced due to particle degradation.

This setup simulates a continuous stirred tank reaction vessel in a small enough footprint to facilitate replication. To maintain the 1 N:MP ratio, 196 mg of MP was added to 20 ml of the standard feed solution. For pH control, 1.0M NaOH was micropipetted into the jars. The total run time for the test run was roughly 10.5 hours (nonconsecutive). The full-time course run and the pH cascade study were 300 minutes each. Probe data was taken at 30-minute intervals for the full-time course run and the pH cascade study. Data gathered included pH and ammonium probe data. Grab samples were also taken at each 30-minute interval to allow for IC analysis and confirmation of probe data.

A preliminary time course study was conducted using samples of 196 g of 150, 250, and 350 micron particles. The initial sample feed was dosed to an initial pH of 8.5 and 20 ml were pipetted into glass jars containing the MP. The jars were placed on a stir plate (e.g., 2MAG Mix 15eco) for the duration of the test.

Time Course Study Results and Discussion

The data showed stark drops in ammonia concentration after being dosed with NaOH. The rate of MAP formation clearly accelerates and then levels after about 2 hours. The data show the pH levels over time for the first two caustic dosings. It was expected that the drop in pH would correspond to the drop in ammonia. The kinetics of the reaction slow dramatically around a pH of less than 7. In all, a total of 6 dosings were performed over the course of 10.5 hours for the test run (including dosing the feed). The three different particle sizes converge on the same ammonia removal of ~50 ppm. This contradicts the previous theory that the smaller particle sizes would have a higher capacity for ammonia. Upon processing of the final sample for the test run, it was noticed that liquid solid separation could not be achieved via a 10 µm filter. What little solid sample was recovered using this filter was an extremely fine paste. It was concluded due to the combination of the long run time and the constant vigorous mixing using the stir bars, that the particles in the test time course study had all been ground to roughly the same sub-micron particle size which lead to the performance convergence over time.

Testing procedures were modified for the full-time course study to minimize particle degradation over the run. The run length was reduced to 300 minutes, and the stir bar speed was set to 300 rpm at time 0. However, at this stir speed, the particles weren't achieving fluidization. The stir bar was set to 1200 rpm at time=90 minutes. The 150 and 250 µm achieved a similar final ammonia probe reading at 239 and 253 ppm respectively. The final ammonia probe reading for the 350 µm particle was 591 ppm.

The decrease in ammonia over time was more rapid in the pH 8.5 solution. This solution also reached the highest ammonia removal when compared to the two other solutions in this study. The average pH obtained during this dosing regime was 8, and data suggest this to be favorable for column conditions. This finding is consistent with previous work.

Time Course Conclusions

The test data showed roughly 300 ppm removal of ammonia per dosing. This suggested the possible use of a recirculating column system. The original design goal was to have a single breakthrough column that would take the ammonia levels from 1000 ppm to 50 ppm in one pass. The kinetic studies performed illustrate that a more feasible system would be a combination of a recirculating column to take the ammonia concentration to below 200 ppm, split the effluent off of the recirculating loop, and send it downstream to a traditional breakthrough column. Data from the pH cascade study show the highest rate of reaction and highest levels of ammonia removal were seen when the control pH was set to 8.5. A pH of 10 had a much slower rate of reaction when compared to solutions with a lower pH. The solubility of the MP may be too low for the dissolution-precipitation mechanism of MAP formation to occur.

Example 12—Ammonia Removal Via MP Reaction Column Setup

Columns were fabricated by hand out of clear PVC pipe and stainless steel pipe. Filters were hand fabricated using 60 micron stainless steel frit and glass wool for packing. A bulk ammonia containing fluid "charge" was loaded into the bulk feed reservoir at the start of the experiment. The feed pump circuit was primed with this fluid then connected to the prepared MP column. The bulk fluid charge was under continuous mixing and had pH and ammonia probes taking readings which were hand recorded. Via use of NaOH dosing pump, the pH of this bulk fluid can be crudely controlled by hand, mostly by running a 0.3 ml/min 1M NaoH flow a portion of the time to control pH to within 0.2 units or so (and keeping within operating criteria). When the experiment started, the feed pump was turned on to the pre-calibrated flow rate (ml/min is converted to BV/hr based on bed's total solid volume). Samples were taken every 10 minutes (5 ml in volume) for both the bulk fluid (the influent that gets "diluted out" by effluent) and the effluent of the column. pH and mV of the ammonia probe were measured for each sample with backpressure and flowrate recorded as well as how long the NaoH pump was run. If backpressure rose above 30 psig the flowrate was lowered to compensate. At the end of the run, the column was disconnected from the flow and blown out with air. The rest of the system was drained, and the feed bottle for NaOH was measured to confirm total NaOH consumed. The column was taken apart, and the solid bed was extracted for testing or regeneration.

Regeneration of Struvite Solid

The regeneration of the MP/MAP was demonstrated in a recycling experiment. Ammonia was loaded onto the MP to MAP conversion in the plug-flow column, the wet plug was removed, cut up with a razor blade and placed in the Regenerable VOC Control System (RVCS) bed for thermal regeneration. The thermal regime was different when the RVCS bed was loaded with a wet MAP plug. The bed temperature decreased below ambient temperature due to evaporative cooling as the wet MAP was being dried. The heating rate was also decreased to 1.3° C./min. In addition, the flow rate through the bed was increased to 2000-3000 ml/min to prevent the humidity in the gas stream to rise above 90% relative humidity (RH), which avoids condensation of water on the mirrors of the Fourier transform infrared (FTIR) spectrometer. The MAP in the RVCS was dried until reaching 45-50% RH before the heaters were turned on because more water would be released. The MAP-MP regeneration took 1.5-3 hours to complete and the MP was practically dry. The powder was reloaded into the plug-flow reactor and loaded with ammonia. The recycling process was repeated three times.

Plant Growth Study Using Struvite Fertilizers

The goal of the plant growth study was to demonstrate if MAP or MP were suitable fertilizers when compared to a commercial slow release fertilizer (e.g., Nutracote 14-4-14). MP could be obtained from urine salts and MAP would be produced from MP loaded with ammonia from urine. Wheat cv Apogee was grown in four fertilizer treatments: control (7.5 g/L Nutracote), Low nitrogen-phosphorous-potassium (NPK) (2 g/L Nutracote), MAP (2 g/L Nutracote+MAP+K2SO4), and MP (2 g/L Nutracote+MP+K2SO4+(NH4)2SO4). The Low NPK treatment was amended with either MAP or MP plus enough (NH4)2SO4 and K2SO4 provide similar N and K percentages as the control. Three wheat plants were planted in three 2-inch pots per fertilizer treatment. The wheat was grown in separate magenta containers that were watered daily at ambient room conditions (23° C., 400 ppm CO2, 50% RH) under white LED lamps (200-300 µmol m-2 s-1 PAR) during a 20 h light:4 h dark photoperiod. The plants were grown for 28 days and plant height, leaf number, leaf width, number of tillers, and chlorophyll content were measured. Dry mass and seed mass were measured at 45 days after planting to determine the effect of MAP and MP fertilization on plant growth.

Analysis

Mass balance data was confirmed using an ion chromatograph (e.g., Dionex ICS-2100 Ion Chromatography System). Ions examined were Mg2+, NH4+, Na+, K+, Cl—, CH3CO2-, and PO4-. For liquid samples a 1:50 dilution was prepared using ultra-pure DI water (980 µL of water; 20 µL of sample). The mixture was filtered using a 0.45 µm filter before being deposited into a 1 ml aliquot for use in the ion chromatograph. Feed samples were also analyzed, but used a 1:100 dilution instead. All solid samples went through an acid digestion process before dilution. Solid samples were mixed with 5 ml of a 5% nitric acid solution (Nitric Acid Trace Metal grade, Fisher A509-P212) and placed in a heat block set at 95° C. for 10 minutes. The total volume was brought to 50 ml using ultra-pure DI water, and the sample was diluted again, 1:500. An ammonium probe was selected for use in real time ammonia detection (e.g., Cole-Parmer ISE electrode, ammonium, double-junction, BNC, Item # EW-27502-03). Several calibration curves were generated. A four-point curve consisting of 1000, 100, 10, and 1 ppm NH4+ (ammonium acetate) in the presence of 1000 ppm K (potassium) was used.

Column Runs—Run 4

After the previous absorption/reaction experiments, it was found that backpressure was the biggest barrier to running the experiment properly. The main changes were switching to the 250 µm particle size for reduced backpressure, followed by the use of 3 ml (6.6 gram) bed size which has an L/D ratio close to 1.5 to reduce backpressure as a function of bed length. This required use of 500 ml charge of feed, which the column could only reduce to the solubility point if close to 100% of the column is utilized, which is unlikely. This prevents collecting of solubility data, which is better left to its own experiment type using water as a feed on MP/MAP solids to allow cleaner effluent data and easier mass balances. The main purpose of this run was to confirm the kinetics of the ammonia removal within the controlled pH range of ~9 for the effluent and 8.5+ on the effluent, which indicate reduced solubility and selectivity for potassium. In order to hit this low (<0.5 pH) drop, the contact time was lowered to 5 seconds (720 BV/hr) which should allow this process to be contact-limited, which has not been demonstrated. Backpressure increase over time is another important variable, and it needs to be minimized (backpressure is expected to increase 50% regardless due to the crystals growing larger and the bed expanding 50% in length).

| Run 4 Description | |
|---|---|
| Column size (mass/volume) | 6.6 grams (3 ml) inside 1/2" column (1.5 L/D ratio) |
| BV/hr or contact time | 720 BV/hr or 5 seconds contact time |
| Expected inlet pH | 9.0 |
| Expected outlet pH | 8.5 |
| Particle size | 250 micron |

-continued

| Run 4 Description | |
|---|---|
| Total feed column passes | 12 |
| Starting and ending backpressure (psig) | 1.5-7 psig (less than 5× multiple for the experiment) |

This run was performed at an actual pH influent starting condition of 8.93 after dosing the bulk fluid with 5 ml of 1M NaOH and flow was started in the recirculation pump at 36 ml/min (720 BV/hr). pH was allowed to drop for 28 minutes until influent was near 8.5 with effluent near 8.1, which in hindsight should have been prevented due to bed dissolution. At the 28 minute mark a flow of 0.3 ml/min of 1M NaOH was added for almost 30 minutes straight until pH reached 9.2. After 90 minutes the delta pH from the inlet and outlet of the column was below 0.22, with backpressure still well within the safe range to not cut flowrate. As usual, samples were collected on the influent (bulk) and effluent reactor every 10 minutes with pH/ammonia probes measurements taken in real time.

The pH regime for Run 4 can be described as a slow decrease for the first 30 minutes of around 0.01 units/minute, then a 30 minute rise of 0.01 units/minute, then the last 30 minutes had a near 0.05 units/minute fall (due to less ammonia kinetics lowering the pH due to mass transfer of the new MAP layer on the MP crystals). Once effluent pH dropped below 8.5 the bulk beaker proceeded to gain cloudiness indicating the dissolving of the bed into said bulk fluid. Due to pH control, the particles re-precipitated and deposited onto the top of the bed within 30 minutes due to the high recycle rate, which was unable to be demonstrated in previous runs. These fines likely contributed to backpressure, but cannot be determined when overlayed with pH due to the time-delay in fine accumulation back into the bed. Potassium levels in the bulk fluid were constant regardless of pH and mirrored sodium values minus the addition of NaOH.

Via use of Ammonia probe (and pH correction of the data) the ammonia loss was shown as 500 ppm (800 to 300) over 90 minutes with no signs of slowing down. Lower than 1000 ppm is likely due to feed degradation of either the stocks or the ammonium acetate (which is refrigerated) due to ammonia's volatility. IC data indicates a small drop (300 ppm) with a noticeable slowing down after 1 hour of treatment. Both ammonia methods show very significant drop off in ammonia delta (difference in concentration between influent and effluent after one pass) over time showing slower kinetics/uptake as the solid converts to MAP from MP from the outside in.

| Run 4 Data | |
|---|---|
| Run | 4 |
| PSI/BV/hr (max) | 0.0097222 |
| NaoH consumed (grams) | 0.64 |
| Ammonia removed mg (IC) | 159.65621 |
| Ammonia removed mg (probes) | 249.5927 |
| ammonia removed mg/g/hr (IC) | 27.307938 |
| ammonia removed mg/g/hr (probes) | 90.224089 |
| NaoH/g NH4 (IC) | 4.0086133 |
| NaoH/g NH4 (probes) | 2.5641776 |
| % capacity used (theoretical) (IC) | 0.2342834 |
| % capacity used (theoretical) (probes) | 0.3662584 |
| total beaker passes through column | 12 |

Compared to previous runs, this run has the lowest backpressure corrected for flow rate. This is due to the tight pH control regime that prevents fine formation and secondary crystallization (new formation of struvite particles by approaching the solubility minimum from the right side). Five second contact time with 250 micron particles was sufficient to limit pH drop while keeping the process in a kinetically viable regime and allowed somewhat simplified control of the process (minimum pH dosing and no changes to other variables). Peak ammonia removal was almost 100 mg/g/hr which is much faster than traditional processes but is lower than what is likely to be achieved with smaller higher surface area particles (at the cost of pumping energy). The alkalinity consumption was between 2.5-4 g NaOH/g NH4, which is significantly lower than the 4.6 g NaoH/g NH4 of NaOH needed to nitrify ammonia in biological systems. Capacity in this short run was only 25-35% of theoretical capacity.

Run 4 Conclusion

The contact time and pH regime for the most part were effective. For subsequent runs a rule will be in place to avoid effluent pH below 8.5 to prevent bed solubility. pH control will be applied earlier in the run to avoid this. The next run will investigate if the 150 micron particle allows similar control at these parameters and if it offers any performance advantages compared to its backpressure cost.

Run 5

After establishing acceptable operating conditions in Run 4, the next area of interest was to see if performance could be increased using a smaller particle size while still controlling the effluent pH to prevent bed loss. The capacity and longer-term kinetics of the 250 micron particle run (Run 4) did not perform optimally, and the new 5-second contact time regime was appropriate for our test stand (ran within our safety margins and did not undershoot pH). Due to the previous run's pH issue with not dosing fast enough, the 0.3 ml/min 1M NaOH started at t0 to compensate.

| Run 5 Description | |
|---|---|
| Column size (mass/volume) | 6.6 grams (3 ml) inside 1/2" column (1.5 L/D ratio) |
| BV/hr or contact time | 720 BV/hr or 5 seconds contact time |
| Expected inlet pH | 9.0 |
| Expected outlet pH | 8.5 |
| Particle size | 150 micron |
| Total feed column passes | 15.6 |
| Starting and ending backpressure (psig) | 1.5-24 psig (more than 15× multiple for the experiment) | pH at t0 was 9.2 to counteract the expected fast pH drop with this more efficient column. The pH dosing was continued until 10 minutes have elapsed, where pH rose to 9.4. Afterwards pH was allowed to fall for an hour until another 10 minute dose was initiated at 8.78 and back up to 9.2. Backpressure increased up to 24 psig (from 2 psig) which was still safe to run in our test stand. After 2 hours the pH delta from the influent to effluent of the column was 0.02 where it was expected no meaningful capacity had been used. Again influent and effluent samples and pH/ammonia probe measurements were taken every 10 minutes.

| Run 5 Data | |
| --- | --- |
| Run | 5 |
| PSI/BV/hr (max) | 0.033333 |
| NaOH consumed (grams) | 0.828 |
| Ammonia removed mg (IC) | 244.8667 |
| Ammonia removed mg (probes) | 195.082 |
| ammonia removed mg/g/hr (IC) | 43.30933 |
| ammonia removed mg/g/hr (probes) | 38.69207 |
| NaoH/g NH4 (IC) | 3.381432 |
| NaoH/g NH4 (probes) | 4.24437 |
| % capacity used (theoretical) (IC) | 0.359323 |
| % capacity used (theoretical) (probes) | 0.286268 |
| total beaker passes through column | 15.6 |

Potassium and backpressure didn't seem to respond with pH, with the former being more or less constant (and at predicted levels) and the later seeming to increase with ammonia absorption (column swelling). This indicates that even up to pH 9.4 (and likely not much beyond there) there is no significant potassium selectivity. Likewise with pH staying above 8.75 in the effluent there was no loss of the bed. This run had increased alkalinity consumption (over 20% higher than Run 4) with 400-500 ppm ammonia removed from the bulk solution. This led to higher (when using IC measurement) capacity of the solid utilized at over 35%. The rate of ammonia removal was hard to measure due to fuzziness at the beginning of the experiment (where this peak is seen) likely due to high pH. When compared to the 60 or 90 minute mark of Run 4, the smaller particles seem to lead to 50%+ higher kinetics.

This run demonstrated that between pH 8.5-9.5 consistent operation can be maintained. However the backpressure due to ammonia absorption is still quite high even without secondary crystallization and fine production. Further runs will utilize the 250 micron particles for easier operation even with reduced metrics.

Regeneration Runs

The percentage of NH3 removed from MAP during regeneration measured by IC ranged between 31 to 64%. However, it was found there were differences in % NH3 removed as high as 20% due to sampling errors alone. This indicates that the MAP/MP content varies within the RVCS bed. The amount of NH3 released from either 100 or 250 micron MAP heated either at 50° C. or 100° C. measured by FTIR ranged between 14-57 mg. Several corrections were applied to determine that the amount of NH3 removed from the MAP were higher. These differences will affect the mass balances that can be calculated using this data. It was found that 50° C. regeneration was slow (2.5 hours until 50% terminal removal) but yielded 60% (IC) to 90% (FTIR) removal of ammonia after 1750+ minutes. It has been calculated that heating costs are lower than sweep gas costs so 100° C. was tried as a temperature setpoint. Four runs at this setpoint were performed, with average time to 50% terminal removal being 10-20 minutes with ammonia removal being between 80-100% (with one 34% outlier due to unknown reasons) and the few IC points being between 70-80% ammonia removal (due to sampling error since removal is probably a function of bed location) (FTIR mass balance used the gas flowrate multiplied by gas density at temperature with the ammonia ppm (m/m) to generate ammonia depletion over time. IC mass balance uses (ppm-NH4/ppm-Mg) ratio of the MP (regenerated) sample over the MAP un-regenerated sample to account for water loss. Regeneration was found to be over 50% effective and probably closer to 70-80% effective in removing ammonia in under an hour of treatment.

| Multi-cycle runs - Run 6a absorption | | | | | | | | |
| --- | --- | --- | --- | --- | --- | --- | --- | --- |
| Temperature (° C.) | Media size | MAP mass (g) | sweep flow (L/min * g) | Duration until 50% max removal (minutes) | Total duration of test | mg removed FTIR | % removed FTIR (mass basis) | % removed IC |
| 50 | MAP 100 μm | 1 | 0.76 | 144 | 1758 | 67.6 | 0.922 | 0.616 |
| 100 | MAP 100 μm | 0.7 | 1.057 | 11 | 510 | 47.4 | 0.923 | 0.671 |
| 100 | MAP 100 μm | 1 | 0.74 | 21 | 1758 | 25.16 | 0.343 | 0.795 |
| 100 | MAP 200 μm | 0.5 | 1.72 | 12 | 240 | 37.5 | 1.023 | |
| 100 | MAP 200 μm | 0.5 | 1.66 | 12 | 150 | 30.7 | 0.837 | |
| 50-100 | MAP 200 μm | 1.5 | 0.867 | 138 | 348 | 97.35 | 0.885 | |

With the previous columns (Runs 4 and 5), it was found that Run 4 is somewhat less effective than Run 5, but with a quarter of the backpressure. For safety reasons it was decided to run this less efficient particle size for these multicycle runs. These multicycle runs are like the previous absorption and regeneration studies, but the initial 6.6 gram column material will persist from run to run. After the first absorption (6a absorption), the column is taken apart and the solid (with glass wool) is removed and weighed. It is then placed in the regeneration test stand and dried with Nitrogen to remove labile water (to prevent flooding of the FTIR spectrometer). The solid is then regenerated (6a regeneration), and removed from the test stand and weighed with the glass wool removed. The remaining solid (losses mostly from transport from different vessels) is then packed into the absorption test stand and the parameters are repeated assuming no mass loss (therefore BV/hr increases over these runs since the bed is decreasing in size). This sequence is repeated 3 times to gauge performance as a function of endurance.

Again, Run 6a is a repeat of Run 4 with better attention paid to pH range to prevent it dipping below 8.5 on the effluent.

Run 6a was predictably similar to Run 4, with probe data showing reduced performance while IC data showing an increase in performance (alkalinity consumption was lower). One reason for this is that the tight pH control is centered around a regime with lower kinetics than pH's that allow more solubility (on both ends). Backpressure was 20% less than the previous best run so if there is backpressure allowance (and recirculation) performance can likely be increased by deviating from this range. After the run the column material was removed and transported to the regeneration test stand.

After over 90 minutes of heating at 100° C., 85 mg ammonia (mass basis) was recovered. It was noted that the solid was amalgamated when entering the column but after the regeneration it was a fine powder and was easily removed. This is only seen for wet "produced" MAP, where fresh dry MAP did not break up like this. It is likely that every regeneration will "rest" the solid to these conditions which will prevent backpressure from building up over multiple runs.

Run 6b Absorption

Once getting the column materials back from the regeneration test stand, the major difference noticed was that the particles were a fine powder, finer than the MP we started with. This demonstrated that besides removing ammonia, the regeneration process is able to completely break down the amalgamation of the particles. The starting pressure drop was also identical to 6a. This is required for this process to be used in a cycle. Particle size was not measured, but was estimated around 50-100 microns, nevertheless process parameters were not deviated for this run so it could be compared to the first run.

Operationally, 6b was completely different from 6a. It was noticed within a minute that effluent pH (predicted to be slightly lower than 9) was 6.8, which is the pH normally reached with infinite contact time. This indicated that the process reached completion within 5 seconds which infers a particle size/surface area far greater than previous tested. As predicted, the column started dissolving and backpressure shot up. pH control was aggressively applied but flowrate had to be lowered for safety reasons (120 BV/hr at 10 minutes, 60 BV/hr at 20 minutes). This limited number of bulk passes, but capacity was reached within 20 minutes regardless (indicating 5x kinetics, but limited by alkalinity so likely much higher). IC and probe data indicated slightly better performance than 6a, not accounting for 6b having 20% less column capacity due to losses in transport, and not including any capacity loss due to incomplete regeneration. With these included, the smaller particles caused by the regeneration had probably over 50% ideal capacity, and if not for the inability to control the process, likely could have been higher. It was not predicted that regeneration would make the process better than the initial run.

Run 6b Regeneration

This run went even better than the first run, likely due to starting with smaller particles before the second absorption. This run ran for 90 minutes at 100° C. like the first one, but the vast majority of the ammonia (95 mg mass basis) came off within 30 minutes and the large majority within 15 minutes (75%). It was found that about half the water came off before the ammonia (below 100° C.) and once set point was hit the other half of the water came off, but more slowly than ammonia which still allows a sort of chromatographic separation.

Run 6c Absorption

Due to the previous run, procedural changes were made in the experiment. A contact time of 1 second would be used, and the bulk fluid would be done in a single-pass (no recirculation) system, to allow single dosing of influent to allow consistent pH control inside the column to simplify operation. An influent pH of 9.25 would be used to try to minimize bed loss and to give more buffer on the pH drop (allow 0.75 pH drop). Each sample would be a 250 ml "slug" of influent and every 2 slugs, the effluent slugs would be re-dosed with alkalinity and run through again until 3 complete passes were attempted. The recovered solid from the second regeneration was again powdery as the first regeneration, which further confirms that regeneration allows the process to "reset" regardless on how the absorption went, which allows the process to be designed for what the regeneration yields.

| | pH in | pH out | NH4 probes in | NH4 probes out | NH4 probes delta | NH4 IC in | NH4 IC out | NH4 IC delta | K+ in | K+ out | PSI/BV/hr |
|---|---|---|---|---|---|---|---|---|---|---|---|
| 250 ml first half first pass | 9.25 | 8.20 | 716 | 472 | 244 | 1071 | 535 | 536 | 1023 | 997 | 0.0069 |
| 250 ml second half, first pass | 9.25 | 8.92 | 716 | 580 | 136 | 1071 | 612 | 460 | 1023 | 1021 | 0.0056 |
| 250 ml first half, second pass | 9.10 | 8.82 | 562 | 467 | 95 | 568 | 447 | 122 | 1003 | 975 | 0.0069 |
| 250 ml second half, second pass | 9.15 | 9.03 | 572 | 539 | 33 | 568 | 522 | 46 | 1003 | 979 | 0.0083 |
| 250 ml first half, third pass | 9.07 | 8.94 | 531 | 426 | 105 | 523 | 590 | −67 | 996 | 965 | 0.0083 |
| 250 ml second half, third pass | 9.00 | 8.94 | 560 | 520 | 41 | 523 | 483 | 40 | 996 | 981 | 0.0097 |

Due to the single pass and re-dose procedure mentioned above, the above table is the full data output of the experiment. It can be seen that pH control was unmaintainable even at 1 second contact time (likely 0.5 second due to bed loss) for the first 250 ml pass. Since that sample is the average of the 250 ml slug ran through the column, the first 150-200 ml were likely below the ideal pH and dissolved some of the bed into the sample. It likely would have required a contact time near 200-300 milliseconds to maintain pH ranges required. However after 1 pass and re-dosing, pH drop for the next 2 passes (4 samples) was below 0.2 which indicates capacity has been reached. Backpressure as a function of flow was kept low and 1 second contact time was maintainable below 30 psi. If this run was repeated the slug sizes would be reduced and flowrate increased for the first few samples until kinetics slows down to allow higher contact time. It is noted that it took only 4 minutes or less to remove a similar amount of ammonia as some runs took hours, so this could be exploited in the proper system that can handle the flowrates and pressures involved.

The first pass ran successfully at 1 second contact time (3600 BV/hr). Effluent pH averaged for the batch at 8.2, meaning that 1 second contact time is still too slow (backpressure limits faster flowrates on our current test stand however). The second slug had an average effluent of 8.92, showing that the majority of the capacity has already been used (due to the high ammonia delta per pass with the high pH swing). After 3 complete bulk fluids passes, the effluent ammonia dropped less than 0.06 units of pH indicating the solid was at capacity.

Run 6c Regeneration

This regeneration was similar to previous runs, but took longer to remove 128 mg (mass basis) ammonia. It took 25 minutes for half the final ammonia value to be removed (compared to 9 minutes with the second regeneration and 17 minutes with the first regeneration) and the ammonia peak is more broad in the right tail. This is because conditions that allow better absorption might not help the regeneration and vice versa. This regeneration recovered the most ammonia but didn't recover as much as absorbed, and at best a bit over half.

| | Run 6c Data | | | | |
|---|---|---|---|---|---|
| Run | 4 | 5 | 6a | 6b | 6c |
| Column size (mass/volume) | 6.6 grams (3 ml) inside 1/2" column (1.5 L/D ratio)* | | | | |
| BV/hr or contact time | 720 BV/hr | 720 BV/hr | 720 BV/hr | 720-60 BV/hr | 3600 BV/hr |
| Expected inlet pH (control value) | 9 | 9 | 9 | 9 | 9 |
| Expected outlet pH (control value) | 8.5 | 8.5 | 8.5 | 8.5** | 8.5** |
| Particle size | 200 micron | 100 micron | 200 micron | 200 micron*** | 200 micron*** |
| PSI/BV/hr (max) | 0.00972222 | 0.033333333 | 0.00722222 | 0.283333333 | 0.009722222 |
| NaOH consumed (grams) | 0.64 | 0.828 | 0.546 | 0.64 | 0.56 |
| Ammonia removed mg (IC) | 159.656 | 244.867 | 187.992 | 136.227 | 274.216 |
| Ammonia removed mg (probes) | 249.593 | 195.082 | 135.232 | 150.646 | 92.513 |
| ammonia removed mg/g/hr (IC) | 27.308 | 43.309 | 152.532 | 84.817 | 175.441 |
| ammonia removed mg/g/hr (probes) | 90.224 | 38.692 | 9.850 | 99.589 | 79.915 |
| NaoH/g NH4 (IC) | 4.009 | 3.381 | 2.904 | 4.698 | 2.042 |
| NaoH/g NH4 (probes) | 2.564 | 4.244 | 4.037 | 4.248 | 6.053 |
| % capacity used (theoretical) (IC) | 0.234 | 0.359 | 0.276 | 0.200 | 0.402 |
| % capacity used (theoretical) (probes) | 0.366 | 0.286 | 0.198 | 0.221 | 0.136 |
| total beaker passes through column | 12 | 15.6 | 15.6 | 2.5 | 3 |

*Run 6b was 4.1 grams, while 6c was 3.3 grams; lost mass due to transfer; performance was not corrected for weight
**PH control was not able to be maintained
***Particle size was reduced after regeneration, not measured but likely below 50 microns and potentially microporous

| Run | mg absorbed | absorption MP mass (g) | Regeneration mass (g) | mg regenerated off | % recovery (corrected) |
|---|---|---|---|---|---|
| 6a | 187.9919493 | 6.6 | 4.3 | 85 | 0.6939931 |
| 6b | 136.2271857 | 4.3 | 3.3 | 92 | 0.87999166 |
| 6c | 274.2163 | 3.3 | 2.8 | 128 | 0.55013923 |

With only 3 cycles, it's hard to make predictions on how the $100^{th}$ cycle would go, but the process is repeatable. After the first full cycle the particle size seems to be "reset" around 50 microns and this can be designed for both absorption and subsequent regeneration (it still amalgamates but seems easier to remove from column so the end structure is different from "virgin" MP runs). As long as the flow rates can keep pH in the proper bounds, the column can keep removing 100-300 mg of ammonia even after significant mass loss via transfer and dissolving (when below 8.5 pH). Backpressure at the start of every run was similar (1-2 psig) and the ammonia removed duration regeneration, even though it is not complete is enough to allow it to cycle without performance loss.

Although the present invention has been disclosed in terms of a preferred embodiment, it will be understood that numerous additional modifications and variations could be made thereto without departing from the scope of the invention as defined by the following claims.

We claim:

1. An ammonia absorption and regeneration system comprising:
   at least one packed column including packing material having a surface of solid magnesium phosphate or a mixture of solid magnesium phosphate and solid magnesium ammonium phosphate;
   whereby said at least one packed column is capable of cycling between an ammonia absorption operation and an ammonia regeneration operation;
   wherein said ammonia absorption operation includes subjecting the at least one packed column to a wastewater influent stream including ammonia and water to convert at least some of said solid magnesium phosphate on said surface of said packing material to solid magnesium ammonium phosphate on said surface of said packing material resulting in a packed column absorber effluent stream having a reduced amount of ammonia compared to said wastewater influent stream; and
   wherein said ammonia regeneration operation includes subjecting the at least one packed column to a regeneration temperature above 50° C., or a regeneration pressure below 1 ATM, or both, to convert at least some of said solid magnesium ammonium phosphate on said surface of said packing material to solid magnesium phosphate on said surface of said packing material and regenerated vapor-phase ammonia and water; said regenerated vapor-phase ammonia and water is purged from the at least one packed column.

2. The ammonia absorption and regeneration system of claim 1 further including a wastewater influent stream containing a basic solution such that the packed column absorber effluent stream maintains a pH between 8.5-9.5.

3. The ammonia absorption and regeneration system of claim 1 wherein said packing material further comprises solid magnesium phosphate particles having a mean particle size ranging from 50-300 microns.

4. The ammonia absorption and regeneration system of claim 1 wherein said at least one packed column has a packing density of the column above 1 kg of said packing material having a surface of solid magnesium phosphate or a mixture of solid magnesium phosphate and solid magnesium ammonium phosphate per liter packed column volume.

5. The ammonia absorption and regeneration system of claim 1 wherein said packing material further comprises modified random packing materials.

* * * * *